US 8,040,546 B2

(12) United States Patent
Matsumoto et al.

(10) Patent No.: US 8,040,546 B2
(45) Date of Patent: Oct. 18, 2011

(54) MULTIFUNCTION DEVICE HAVING PARALLEL PROCESSING FUNCTION FOR DATA COMPRESSION AND EXPANSION

(75) Inventors: Daisuke Matsumoto, Nagoya (JP); Hiroshi Morisaki, Kitanagoya (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 1154 days.

(21) Appl. No.: 11/797,909

(22) Filed: May 8, 2007

(65) Prior Publication Data

US 2007/0258116 A1 Nov. 8, 2007

(30) Foreign Application Priority Data

May 8, 2006 (JP) ................. P2006-129255

(51) Int. Cl.
*G06F 15/00* (2006.01)
*G06F 11/30* (2006.01)
(52) U.S. Cl. ...................... 358/1.15; 713/340
(58) Field of Classification Search ........... 358/1.15, 358/1.16, 1.18, 1.2, 474, 402, 444, 500; 399/15, 399/18, 366; 713/320, 340; 400/62, 71, 400/63
See application file for complete search history.

(56) References Cited

U.S. PATENT DOCUMENTS

| 6,587,735 B1 | 7/2003 | Yaguchi |
| 6,621,592 B1 * | 9/2003 | Takayama et al. ........... 358/1.16 |
| 2008/0204768 A1 | 8/2008 | Ikuno et al. |

FOREIGN PATENT DOCUMENTS

| JP | 8-194812 | 7/1996 |
| JP | 2001-027986 A | 1/2001 |
| JP | 2001-160965 A | 6/2001 |
| JP | 2005-252580 A | 9/2005 |

OTHER PUBLICATIONS

Japan Patent Office, Office Action for Japanese Patent Application No. 2006-129255 (counterpart to above-captioned patent application), mailed Apr. 19, 2011.

* cited by examiner

*Primary Examiner* — Saeid Ebrahimi Dehkordy
(74) *Attorney, Agent, or Firm* — Baker Botts L.L.P.

(57) ABSTRACT

A multifunction device has a plurality of functions. The multifunction device includes an input unit, a general-purpose process unit, a single specific process unit, and an output unit. The input unit receives image data. The general-purpose process unit implements a plurality of tasks for each of the plurality of functions. The plurality of tasks includes compression of the image data in a compression format and expansion of the image data which has been compressed. The single specific process unit is controlled by the general-purpose process unit. The specific process unit implements only two tasks, one task being compression of the image data in the compression format for each of the plurality of functions, the other task being expansion of the image data which has been compressed for each of the plurality of functions. The output unit outputs the image data. The general-purpose process unit determines which the general-purpose process unit or the specific processing unit should implement the compression/expansion.

9 Claims, 20 Drawing Sheets

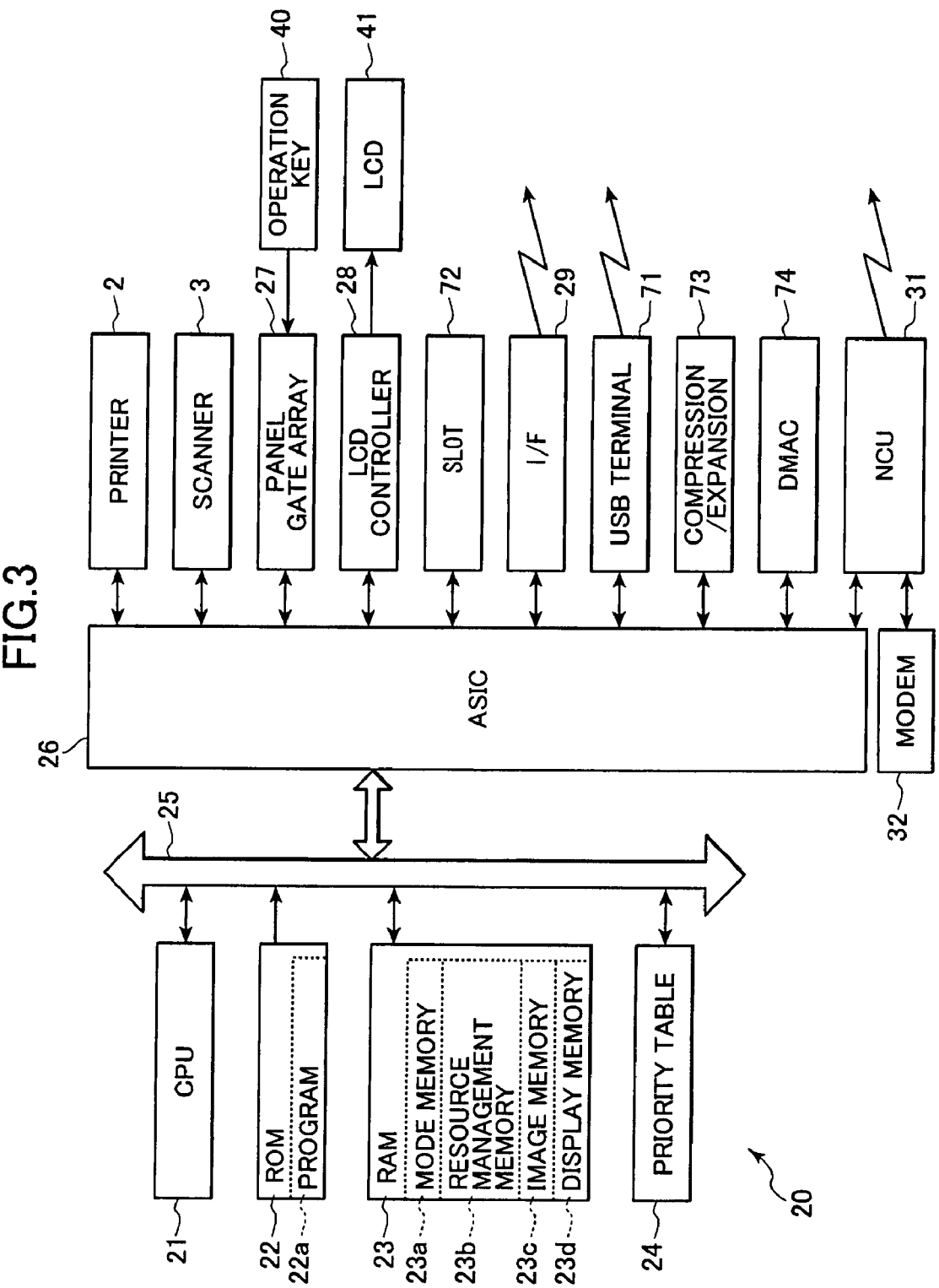

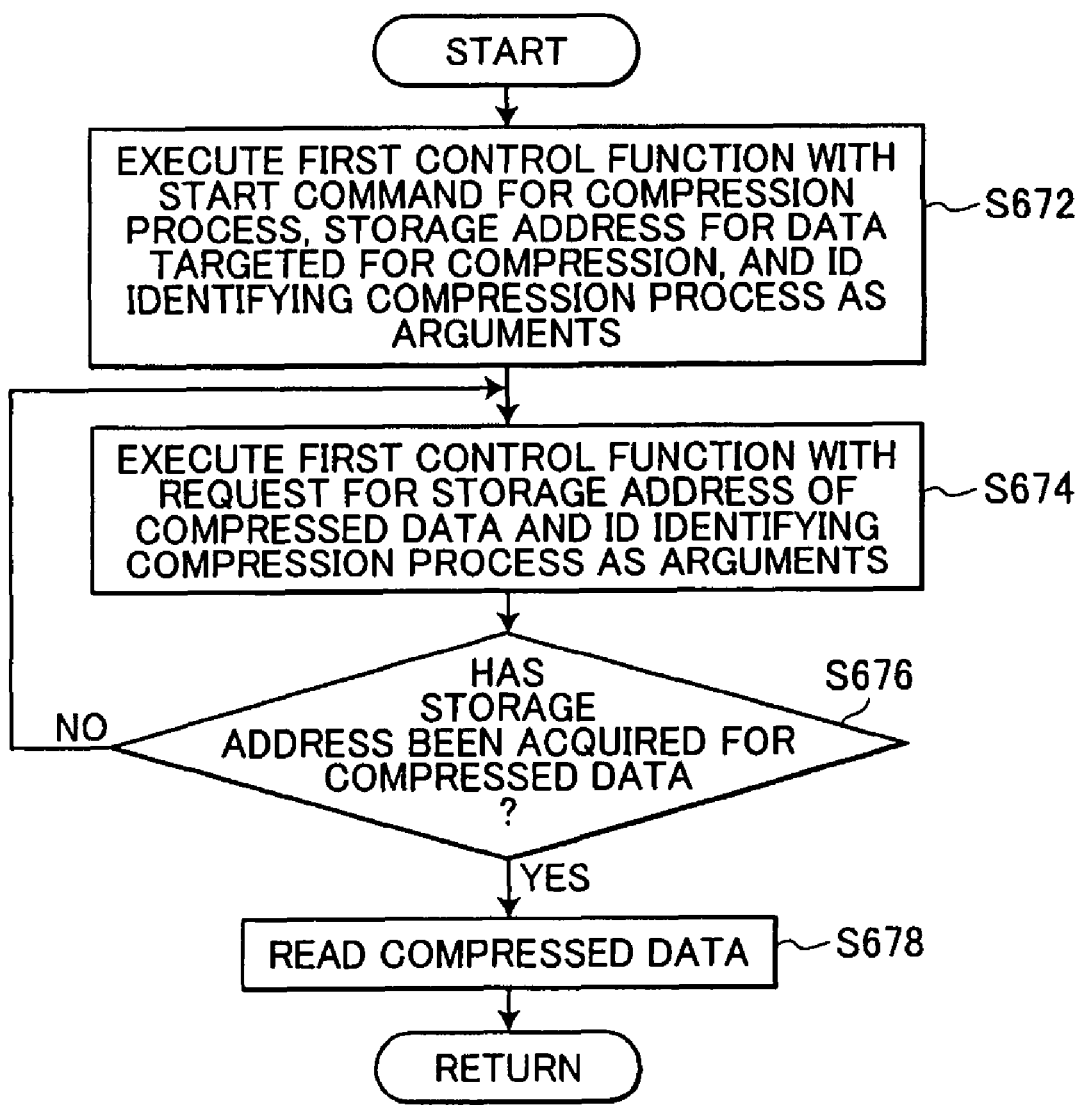

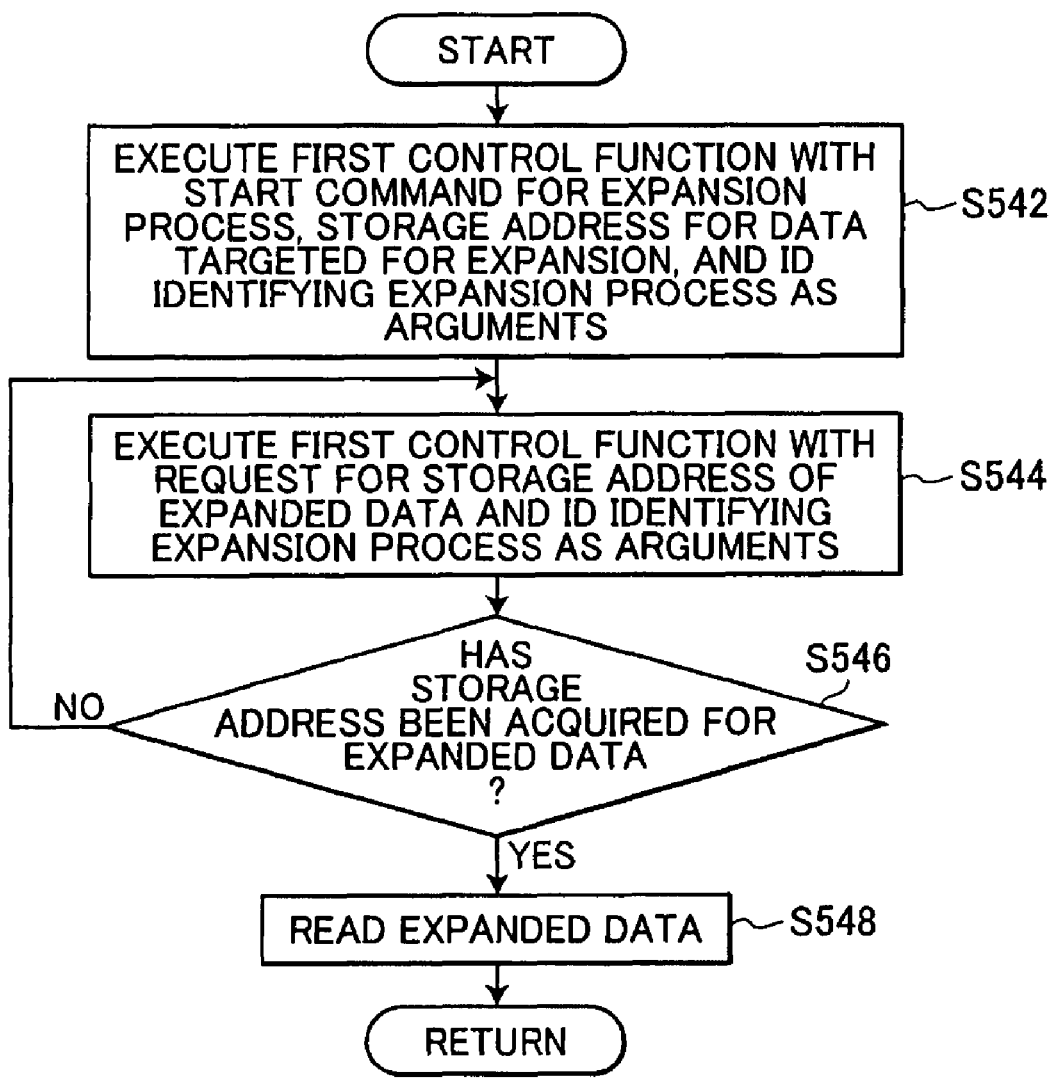

FIG.16

| FUNCTION | AVAILABILITY OF COMPRESSION/EXPANSION CIRCUIT |
|---|---|
| FACSIMILE RECEPTION | NO |
| FACSIMILE TRANSMISSION | NO |
| COPY | YES |
| SCAN | YES |
| DIGITAL CAMERA PRINT | YES |

FIG.18

| FUNCTION | PRIORITY |
|---|---|
| FACSIMILE RECEPTION | 5 |
| FACSIMILE TRANSMISSION | 4 |
| COPY | 3 |
| SCAN | 2 |
| DIGITAL CAMERA PRINT | 1 |

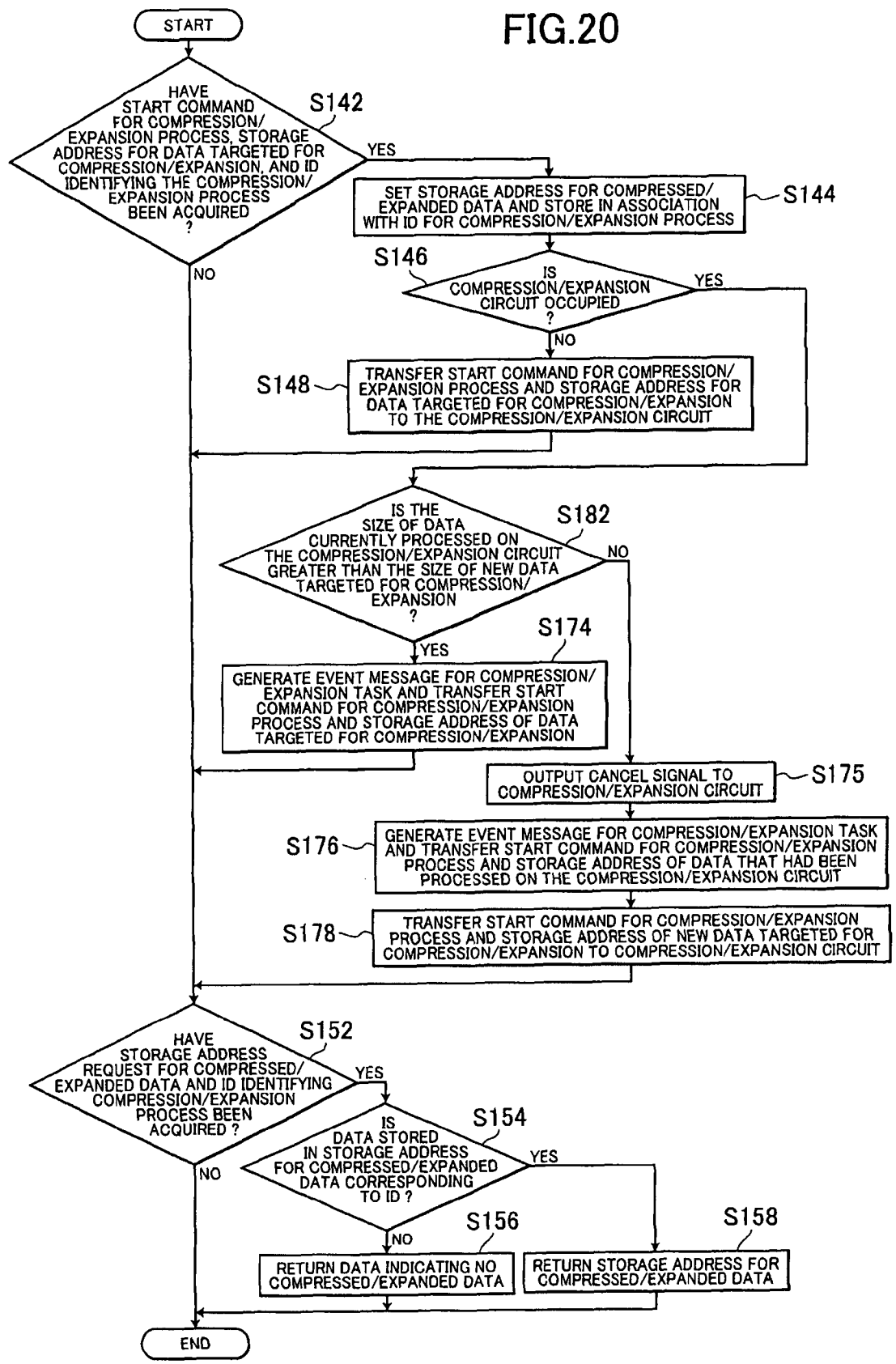

MULTIFUNCTION DEVICE HAVING PARALLEL PROCESSING FUNCTION FOR DATA COMPRESSION AND EXPANSION

CROSS REFERENCE TO RELATED APPLICATIONS

This application claims priority from Japanese Patent Application No. 2006-129255 filed May 8, 2006. The entire content of the priority application is incorporated herein by reference.

TECHNICAL FIELD

The present invention relates to a multifunction device.

BACKGROUND OF THE INVENTION

Multifunction devices having a facsimile function, printer function, scan function, and copy function are well known in the art. In recent years, smaller and less expensive multifunction devices have become widespread.

Some of the multifunction devices are required to compress image data in a prescribed compression format and expand data compressed according to the prescribed compression format. These data compression and expansion processes are essential in particular for multifunction devices having a color scan function, color facsimile function, and PC print function, as the volume of color image data handled by these devices can be considerably large. In recent years, the JPEG format has become commonly used as color image data for images taken by digital cameras, scanned by color facsimile devices, and saved with PC applications. Therefore, multifunction devices that process digital images are required to provide sufficient support for data in the JPEG format.

An image-forming device disclosed in Japanese patent application publication No. HEI-8-194812 is provided with a special JPEG processing hardware for performing JPEG compression processes. Since this hardware is dedicated to JPEG compression and expansion processes, the hardware is advantageous in its ability to perform such processes more quickly than software processes performed by a common CPU.

However, since multifunction devices have multiple functions that require JPEG compression and expansion processes, when one function is using the JPEG processing hardware, another function cannot use the JPEG compression or expansion hardware, requiring excess processing time for the another function to complete the process. A process delay caused by the JPEG compression/expansion process of the another function being completely put on hold until the one function completes a JPEG compression/expansion process can make the user feel uneasy.

This problem can be resolved by providing a plurality of JPEG processing hardware sets, enabling a plurality of processes to be performed in parallel. However, the cost of the JPEG processing hardware itself and the cost of circuit boards and circuit configurations required to connect the plurality of JPEG processing hardware sets to other configurations is excessive and, thus, mounting a plurality of JPEG processing hardware sets in a multifunction device is not desirable when the producing cost of the multifunction device tries to be reduced. Further, since it is necessary to mount the JPEG processing hardware and wiring patterns required to connect the JPEG processing hardware to other configurations on a circuit board, this configuration is not suitable for achieving a more compact multifunction device.

SUMMARY

It is an object of the present invention to provide a multifunction device having various functions and being capable of efficiently performing a compression process or an expansion process for each function with an overall improved processing time, while avoiding an increase in the size and cost of the device.

The present invention provides a multifunction device having a plurality of functions. The multifunction device includes an input unit, a general-purpose process unit, a single specific process unit, and an output unit. The input unit receives image data. The general-purpose process unit implements a plurality of tasks for each of the plurality of functions. The plurality of tasks includes compression of the image data in a compression format and expansion of the image data which has been compressed. The single specific process unit is controlled by the general-purpose process unit. The specific process unit implements only two tasks, one task being compression of the image data in the compression format for each of the plurality of functions, the other task being expansion of the image data which has been compressed for each of the plurality of functions. The output unit outputs the image data. The general-purpose process unit determines which the general-purpose process unit or the specific processing unit should implement the compression/expansion.

BRIEF DESCRIPTION OF THE DRAWINGS

Illustrative aspects in accordance with the invention will be described in detail with reference to the following figures wherein:

FIG. 3 is a block diagram showing a controller provided in the multifunction device;

FIG. 11A is a flowchart illustrating a process to compress data;

FIG. 11B is a flowchart illustrating a process to expand data;

FIG. 16 is a table conceptually illustrating resource table stored in a EEPROM of the multifunction device;

FIG. 18 is a table conceptually illustrating priority table stored in a EEPROM of the multifunction device; and FIGS. 19 and 20 are flowcharts illustrating operations executed by the first control function.

DETAILED DESCRIPTION

Figure 1:
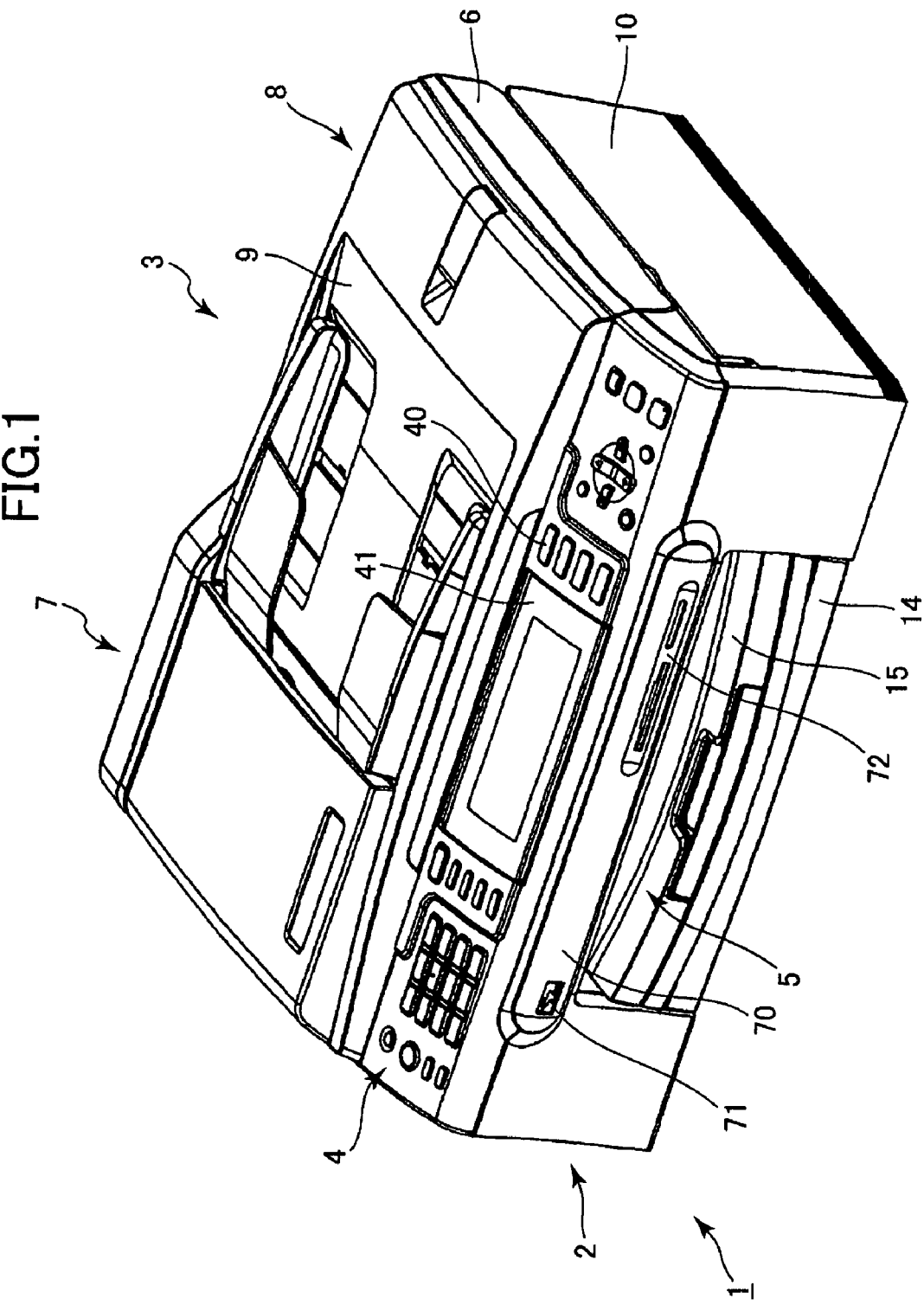
FIG. 1 is a perspective view showing a multifunction device according to a first embodiment.

A multifunction device according to some embodiments of the invention will be described while referring to the accompanying drawings wherein like parts and components are designated by the same reference numerals to avoid duplicating description. In the following description, the expressions "front", "rear", "above", "below", "right", and "left", are used throughout the description to define the various parts when the multifunction device is disposed in an orientation in which the multifunction device is intended to be used.

As shown in FIG. 1, the multifunction device 1 has a main casing 10, a printer 2 disposed in a lower section of the main casing 10, a scanner 3 disposed in an upper section of the main casing 10, and a control panel 4 provided on a front side of the main casing 10 and connected to a controller 20 (not shown). A user can select through the control panel 4 one of the functions; a scan function, copy function, facsimile reception function, and facsimile transmission function. The multifunction device 1 is connectable to a digital camera or other external device, and able to accept a memory card or other storage media. The multifunction device 1 implements a digital camera print function for reading data from the external device or data stored on a storage medium, displaying the images on a liquid crystal display (LCD) 41 or forming the images on a recording paper based on this data.

It should be noted that the multifunction device 1 does not have to have all the functions described above. Further, in addition to the functions described above, the multifunction device 1 is connectable to a computer (not shown) and may implement a print function for forming images and text on recording paper based on print data transmitted from the computer. Further, the multifunction device 1 transmits data, which has been acquired by executing various functions, to the external device connected thereto, thereby storing data on the external device having a storage, or directing the external device to process, display, transmit, print, or perform other processes on the data.

Figure 2:
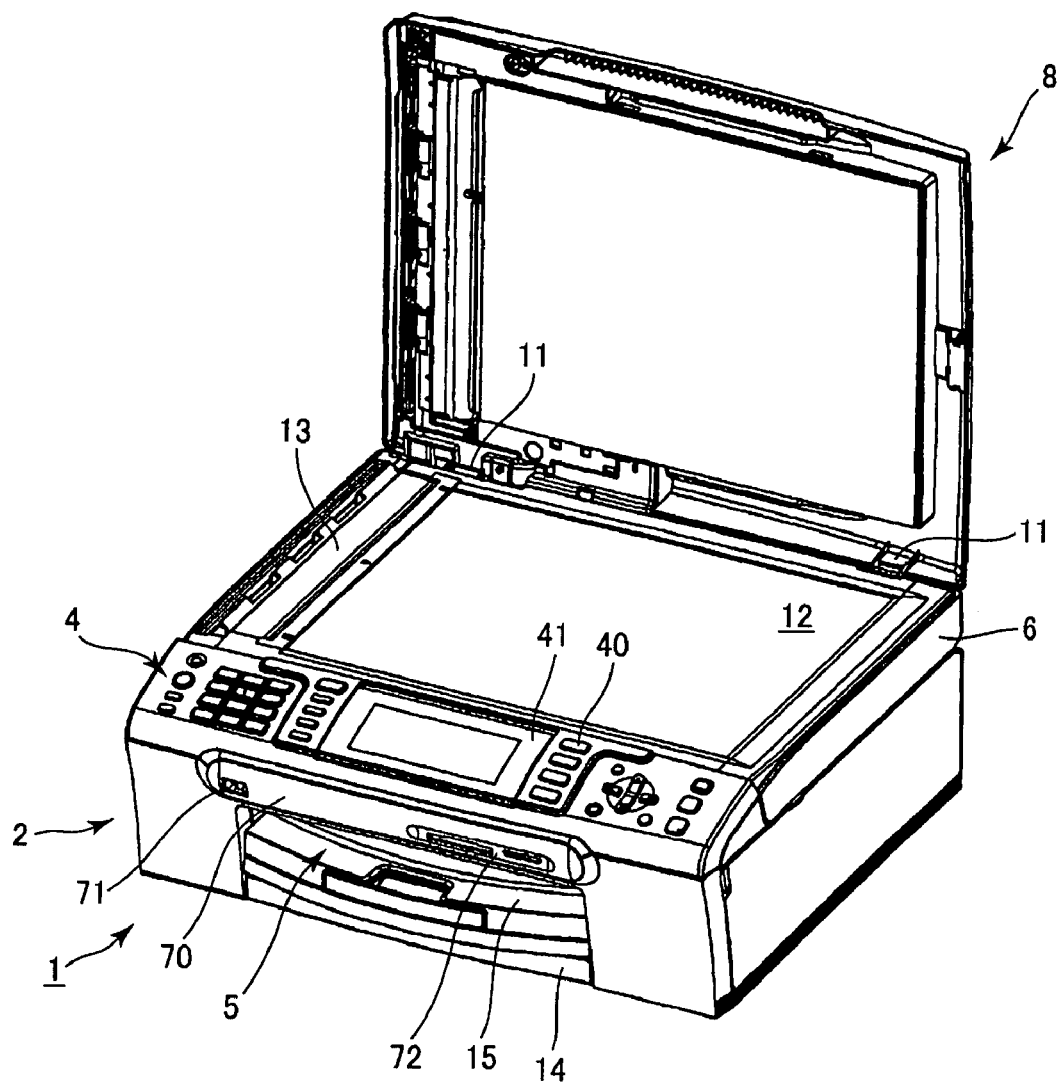
FIG. 2 is a perspective view showing the multifunction device when a document cover is open.

The scanner 3 is a flatbed type of scanner having a document reading base 6, and a document cover 8. The document cover 8 includes an automatic document feeder (ADF) 7, and is mounted on the document reading base 6 by hinges 11 (see FIG. 2) disposed on the rear side of the document reading base 6 so that the document cover 8 can open and close on the document reading base 6. As shown in FIG. 2, a rectangular platen glass 12 is disposed in the top portion of the document reading base 6, and an image-reading unit (not shown) is built into the document reading base 6.

To use the scanner 3, the user opens the document cover 8 and places an original document on the platen glass 12. Next, the user closes the document cover 8 to secure the original. When a command is inputted to begin scanning the document, the image-reading unit scans the original on the platen glass 12, thereby reading an image from the original.

The printer 2 is disposed below the scanner 3. In this embodiment, the printer 2 is an inkjet printer that forms images on a recording paper by selectively ejecting ink droplets based on image data. The printer 2 may employ various other image-forming systems, such as an electrophotographic system or a thermal transfer system.

An opening 5 is formed in the front surface of the main casing 10. A feeding tray 14 and a discharge tray 15 are provided in two vertical levels within the opening 5.

A substantially U-shaped paper-conveying path is provided in the printer 2 linking the feeding tray 14 to the discharge tray 15. The paper-conveying path curves upward from the rear side of the feeding tray 14 and subsequently leads toward the front surface side in the discharge tray 15. The multifunction device 1 forms an image on the recording paper at an image-recording position along the paper-conveying path.

The control panel 4 is provided on the front surface of the main casing 10. The control panel 4 enables the user to operate the printer 2 and the scanner 3. The control panel 4 includes various operating keys 40 and the LCD 41 mentioned above. The user can enter desired instructions via the operating keys 40 of the control panel 4.

Referring to FIG. 3, the controller 20 is provided in the main casing 10 to control operations of the multifunction device 1 based on the user entering instructions. In addition to instructions entered via the control panel 4, the controller 20 may control operations of the multifunction device 1 based on instructions transmitted from the computer connected to the multifunction device 1.

A connection panel 70 is provided above the opening 5 formed in the printer 2. A USB terminal 71 is provided in the left side of the connection panel 70 for connecting an external device such as a digital camera or personal computer to the multifunction device 1 via a USB cable so that the multifunction device 1 can communicate with the external device. A plurality of card slots 72 are provided in the right side of the connection panel 70 for accepting various memory cards. When a memory card is inserted in the card slots 72, the controller 20 can read data from the inserted memory card, display an image based on the read data or information on the data on the LCD 41, and can print a user-selected image on recording paper with the printer 2.

Next, the overall structure of the controller 20 for controlling operations of the multifunction device 1 will be described with reference to FIG. 3. The controller 20 controls the printer 2, scanner 3, and control panel 4. The controller 20 includes a central processing unit (CPU) 21, a read-only memory (ROM) 22, a random access memory (RAM) 23, and an electrically erasable and programmable ROM (EEPROM) 24. The controller 20 also includes an application specific integrated circuit (ASIC) 26 connected to the above components via a bus 25.

The CPU 21 executes programs for implementing the tasks shown in the flowcharts from FIG. 5 to FIG. 20. The CPU 21 is directly or indirectly linked to the printer 2, scanner 3, and a panel gate array 27 via the bus and the ASIC 26 and implements tasks based on signals exchanged with these devices.

The ROM 22 stores programs for controlling various operations of the multifunction device 1. In particular, the ROM 22 stores a compression/expansion program 22a. The compression/expansion program 22a is executed by the CPU 21 to perform a compression/expansion task TS (see FIG. 4A). The compression/expansion task TS serves to compress image data into an image file of the JPEG format and to expand an image file that has been compressed in the JPEG compression format.

The RAM 23 is used as a storage area or work area for temporarily storing data used when the CPU 21 executes a program. The RAM 23 includes a mode memory area 23a, a resource management memory area 23b, an image memory area 23c, and a display memory area 23d.

The mode memory area 23a is provided to store various modes set by the user when the user enters a mode via the control panel 4. By entering instructions on the control panel 4, the user can set the mode of the multifunction device 1 to a facsimile mode for implementing the facsimile transmission function, a copy mode for implementing the copy function, a scanner mode for implementing the scan function, or a digital camera printing mode for implementing the digital camera print function. The mode set by the user is stored in the mode memory area 23a.

The resource management memory area 23b is provided for managing resources by storing data indicating which resources are currently being used and which functions are using the resources. By referring to the resource management memory area 23b, the controller 20 can determine whether the compression/expansion circuit 73 is currently operating and, if so, can determine the function for which the compression/expansion circuit 73 is processing data from among the copy function, facsimile transmission function, facsimile reception function, scan function, and digital camera print function.

The image memory area 23c stores image data scanned by the scanner 3, data read from a digital camera or personal computer connected to the compression/expansion circuit 73 or data read from a memory card inserted in the card slots 72, and data received by facsimile. The display memory area 23d is used for developing data to be outputted to the LCD 41.

The ASIC 26 controls operations of the printer 2, scanner 3, control panel 4, and card slots 72 according to commands received from the CPU 21. For example, the ASIC 26 controls operations of a motor driving the printer 2, an inkjet recording head, another motor driving the ADF 7 of the scanner 3, and the image-reading unit.

The ASIC 26 is connected to the panel gate array 27. The panel gate array 27 controls the operating keys 40 through which the user enters desired instructions to the multifunction device 1. The panel gate array 27 detects when the operating keys 40 are pressed, and outputs prescribed key code signals assigned to the operating keys 40. When prescribed key codes are received from the panel gate array 27, the CPU 21 performs the corresponding control process based on a prescribed key process table. The key process table shows correlations between key codes and control processes, and is stored in the ROM 22, for example.

An LCD controller 28 for controlling the screen display on the LCD 41 is connected to the ASIC 26. The LCD controller 28 displays data on the LCD 41 related to operations of the printer 2 or scanner 3 based on instructions received from the CPU 21. The LCD controller 28 also displays images on the LCD 41 corresponding to image data obtained by the scanner 3 and data read from a memory card.

A parallel interface 29 and the USB terminal 71 are also connected to the ASIC 26 for exchanging data with a computer via a parallel cable or a USB cable. A network control unit (NCU) 31 and a modem 32 are also connected to the ASIC 26 for performing data transmission and reception operations of the facsimile function. A network interface (not shown) may also be provided for performing data communications with computers on a network.

The compression/expansion circuit 73, which compresses image data into the JPEG format and expands data compressed in the JPEG format, and a direct memory access controller (DMA controller) 74 are also connected to the ASIC 26. The DMA controller 74 controls communications in DMA transfers for transferring data without using the CPU 21. The DMA controller 74 transfers data from the image memory area 23c to the compression/expansion circuit 73 and transfers data compressed or expanded with the compression/expansion circuit 73 to the image memory area 23c.

Next, multitasking control performed by the controller 20 will be described with reference to FIG. 4.

Figure 4A:
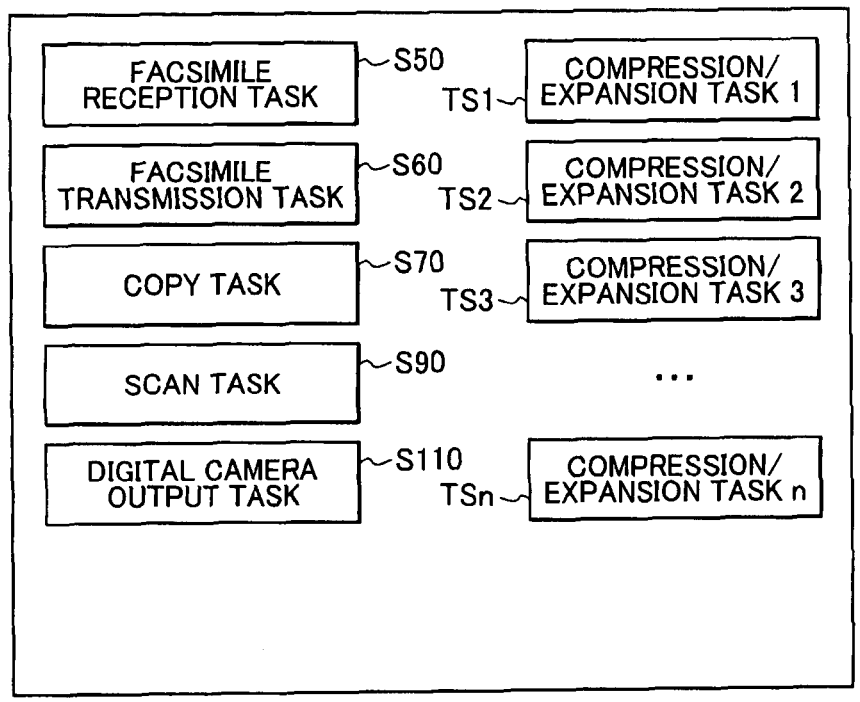
FIG. 4A is a block diagram conceptually illustrating multitasking control performed by a CPU of the controller to execute parallel processes.

As shown in FIG. 4A, the CPU 21 executes a facsimile reception task (S50) for implementing the facsimile reception function, a facsimile transmission task (S60) for implementing the facsimile transmission function, a copy task (S70) for implementing the copy function, a scan task (S90) for implementing the scan function, and a digital camera output task (S110) for implementing the digital camera print function. These tasks will be described in greater detail below with reference to FIGS. 6-10.

The CPU 21 also executes compression/expansion tasks TS1-TSn for compressing image data into JPEG image files or expanding JPEG files. When executing one compression/expansion task TS, the CPU 21 can compress image data into a single JPEG data file or can expand a single JPEG data file. When the CPU 21 executes a plurality of compression/expansion tasks TS in parallel through multitasking control, a plurality of data files can be compressed or expanded in parallel.

The CPU 21 executes a first control function (S140, see FIG. 12) and a second control function (S200) for assigning compression processes for compressing image data into a JPEG image file or expansion processes for expanding a JPEG image file to the compression/expansion circuit 73 or the compression/expansion task TS executable by the CPU 21. The first and second control functions will be described in greater detail later with reference to FIGS. 12 and 15.

The CPU 21 also executes various tasks, including a scanning task, fax control task, printing task, media controlling task, index print data generating task, and key input controlling task.

The CPU 21 begins managing each of the tasks shown in FIG. 4A immediately after the power is switched on. Specifically, when the power is turned on, the tasks shown in FIG. 4A stands ready to start, however, actual processing is not activated. The CPU 21 can execute other tasks than those shown in FIG. 4A that are not shown in the drawings.

Figure 4B:
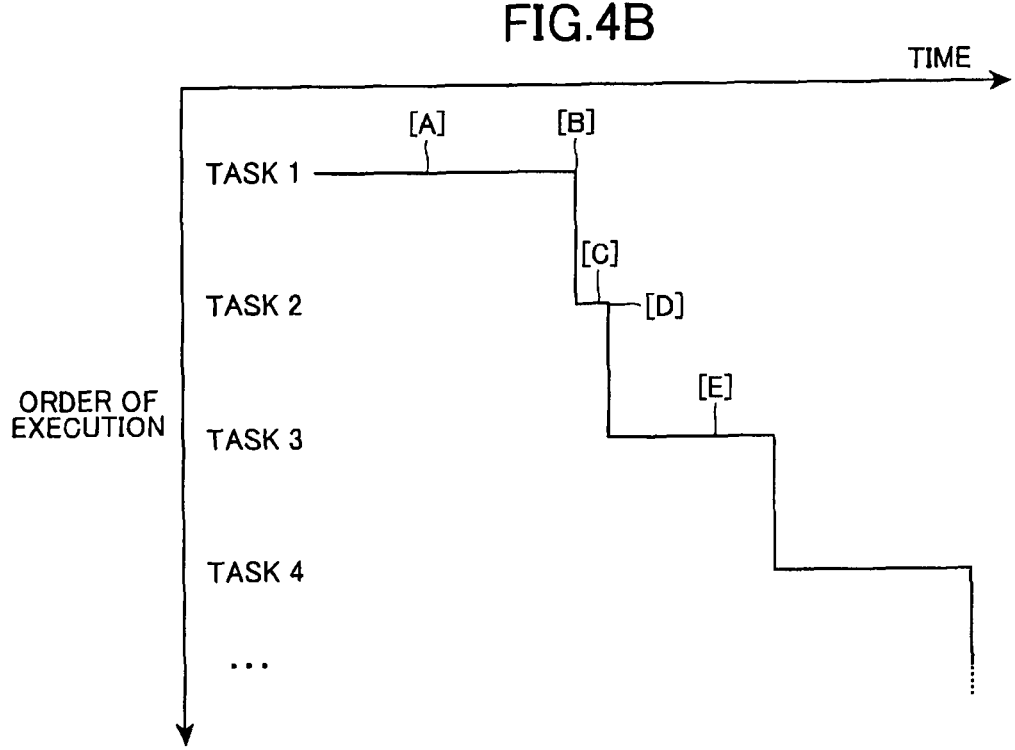
FIG. 4B is a graph showing the tasks executed by the CPU over time.

As shown in FIG. 4B, after the power is turned on, the CPU 21 executes a task having a higher priority. First, the CPU 21 is appropriated to a Task 1 executed first. When an event message is generated for Task 1, Task 1 is executed as shown in [A] in FIG. 4B.

When the Task 1 is completed, the CPU 21 appropriation for Task 1 ends [B], and the CPU 21 is appropriated to the next process (Task 2) [C]. For this description, Task 2 will be a process for which an event message has not been generated. When there is no event message, the process is not executed, and appropriation of the CPU 21 ends [D]. Next, the CPU 21 is appropriated to Task 3, which is the next process in the order of execution [E]. In this type of multitasking control, the CPU 21 is appropriated to each task in order and executes only processes in tasks for which an event message was generated.

Since the CPU 21 switches each task at extremely short intervals, this multitasking control can perform each process (or task) for which an event message is generated in parallel. By executing the facsimile reception task (S50) and the digital camera output task (S110) in parallel, for example, the user can confirm on the LCD 41 data in a digital camera or in a memory card, for example, with the digital camera print task, while the facsimile reception task is printing out data received according to a facsimile procedure.

Next, processes executed on the multifunction device 1 will be described with reference to the flowcharts in FIGS. 5 through 15.

Figure 5:
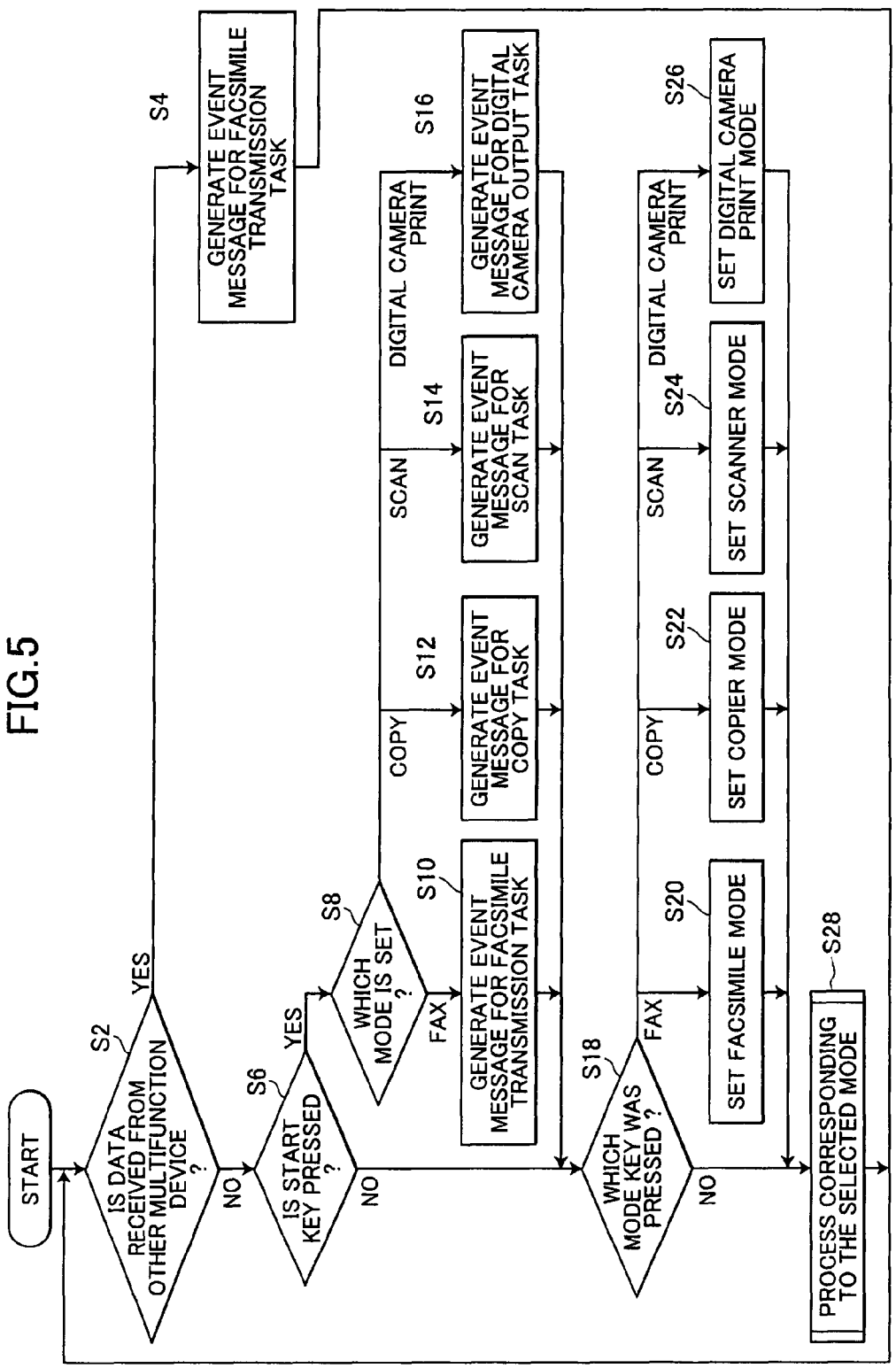
FIG. 5 is a flowchart illustrating a process executed by the multifunction device.

Referring to FIG. 5, in S2 the CPU 21 determines whether data has been received from another facsimile device. If data has been received (S2: YES), then in S4 the CPU 21 generates an event message for the facsimile reception task (S50) and returns to S2. As a result, the facsimile reception task is started and may be executed in parallel with other processes according to multitasking control. The facsimile reception task of S50 is described later with reference to FIG. 6.

However, if data has not been received from another facsimile device (S2: NO), then in S6 the CPU 21 determines whether a start key has been pressed. The start key is provided in the control panel 4 to enable the user to enter an instruction for outputting data. If the start key has not been pressed (S6: NO), then the CPU 21 advances to S18. However, if the start key has been pressed (S6: YES), then in S8 the CPU 21 checks the currently set mode by referencing the mode memory area 23a.

If the currently set mode is the facsimile mode (S8: fax), then in S10 the CPU 21 generates an event message for the facsimile reception task (S60). If the currently set mode is the copy mode (S8: copy), then in S12 the CPU 21 generates an event message for the copy task (S70). If the currently set mode is the scanner mode (S8: scanner), then in S14 the CPU 21 generates an event message for the scan task (S90). If the currently set mode is the digital camera printing mode (S8: digital camera print), then in S16 the CPU 21 generates an event message for the digital camera output task (S110). Subsequently, the CPU 21 advances to S18. The facsimile transmission task (S60), the copy task (S70), the scan task (S90), and the digital camera output task (S110) will be described later with reference to FIGS. 7 through 10.

It should be noted that the multifunction device 1 may be provided with a special start key for each of these modes or some of these modes.

In S18 the CPU 21 determines whether one of the mode keys has been pressed. The mode keys are the operating keys 40 provided on the control panel 4 corresponding to each operation and enable the user to select a desired mode. If any one of the mode keys has not been pressed (S18: NO), the CPU 21 advances to S28.

However, if a mode key for selecting the facsimile mode has been pressed (S18: fax), then in S20 the CPU 21 sets the current mode to the facsimile mode. If a mode key for selecting the copy mode has been pressed (S18: copy), then in S22 the CPU 21 sets the mode to the copy mode. If a mode key for selecting the scanner mode has been pressed (S18: scanner), then in S24 the CPU 21 sets the mode to the scanner mode. If a mode key for selecting the digital camera print mode has been pressed (S18: digital camera print), then in S26 the CPU 21 sets the mode to the digital camera print mode. The mode set in S20-S26 is stored in the mode memory area 23a. In S28 the CPU 21 executes the corresponding process to the selected mode.

In the mode process described above, the CPU 21 sets the mode based on a user operation and generates an event message for a prescribed process from among the facsimile reception task, the facsimile transmission task, the copy task, the scan task, and the digital camera output task. Processes for which an event message is generated are executed in parallel with other processes through multitasking control.

The mode process described above and shown conceptually in FIG. 5 are the processes executed by the multifunction device 1. Specifically, while not shown in FIG. 4A, a fax control task confirms whether data has been received from another facsimile device and generates an event message; and a key input control task confirms whether one of various keys has been pressed and generates an event message. As with the tasks described above, these tasks are executed according to multitasking control. The flowchart in FIG. 5 is provided to conceptually link the operations performed for each task.

Next, the facsimile reception task (S50) will be described with reference to FIG. 6. When executing the facsimile reception task, the CPU 21 confirms the event message for the facsimile reception task and executes the facsimile reception task when an event message exists. In this embodiment, the multifunction device 1 uses the JPEG format as the compression format for data received from another facsimile device.

Figure 6:
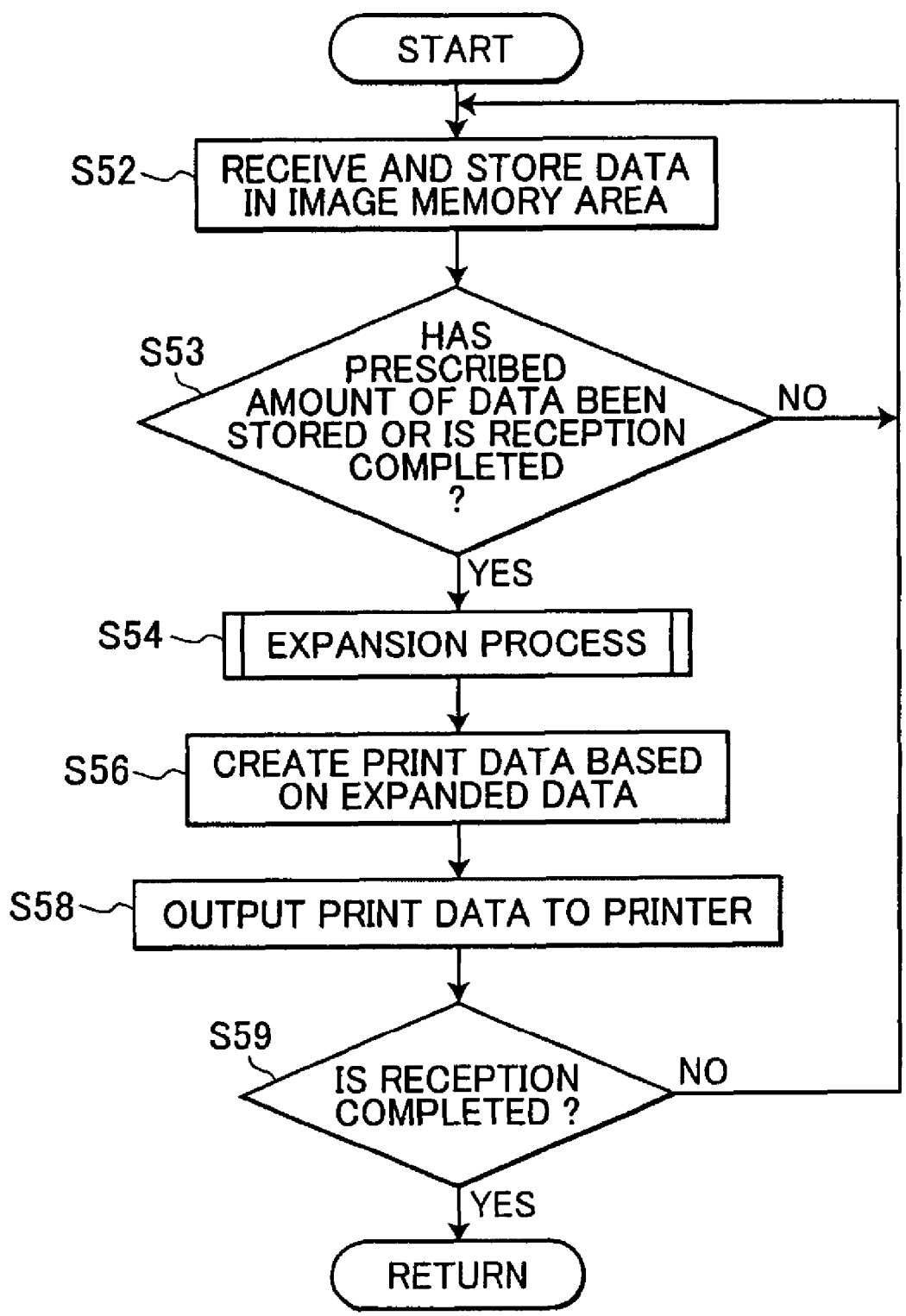
FIG. 6 is a flowchart illustrating a facsimile reception task.

In S52 of FIG. 6, the CPU 21 stores received data together with various information on the image (data size, height and width, and data format) in the image memory area 23c. In S53 the CPU 21 determines whether data reception is complete or whether a prescribed amount of received data has been stored for performing an expansion process. If the prescribed amount of data has been stored or if data reception is completed (S53: YES), then in S54 the CPU 21 executes an expanded data acquisition process for expanding the data stored in the image memory area 23c. In S56 the CPU 21 generates print data based on the expanded image data, and in S58 outputs the print data to the printer 2. The CPU 21 repeats the process from S52 until data reception is completed (S59: NO).

When data reception is completed (S59: YES), the CPU 21 ends the facsimile reception task. Further, when the prescribed amount of print data has been received or when reception is completed, the printer 2 records an image corresponding to the received portion of print data. The expanded data acquisition process of S54 will be described later in greater detail with reference to FIG. 11B.

The printer 2 may print image data acquired in the expanded data acquisition process directly. With this type of multifunction device 1, the step S56 would be omitted from the flowchart in FIG. 6.

Further, the facsimile reception task may begin outputting print data to the printer 2 after completing facsimile reception. In this case, based on operational settings of the multifunction device 1, the process for generating print data may be a process for creating data for a reduced print, a process for creating data for printing a plurality of copies based on the same image data, or a process for creating data for an N-in-1 print for arranging and printing images of a smaller size than a normal printing operation on a single sheet of recording paper based on data for forming images on a plurality of sheets of recording paper in a normal printing operation.

Figure 7:
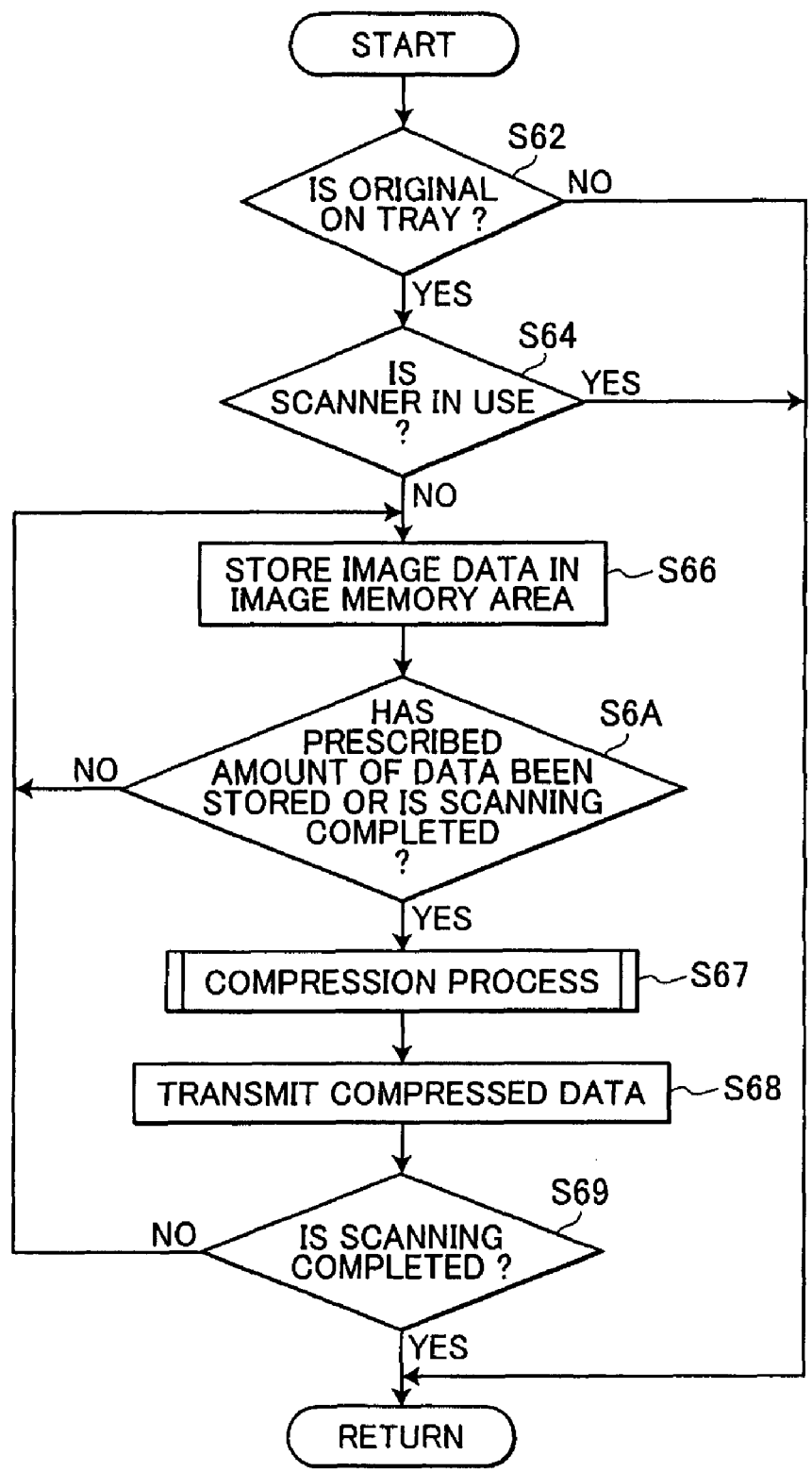
FIG. 7 is a flowchart illustrating a facsimile reception task.

Next, the facsimile transmission task (S60) will be described with reference to FIG. 7. At a timing for executing the facsimile transmission task, the CPU 21 confirms the event message for the facsimile transmission task and executes the task when an event message exists.

In S62 the CPU 21 determines whether an original document is in the document tray 9. If a document is not in the document tray 9 (S62: NO), then the CPU 21 ends the facsimile transmission task.

However, if an original is in the document tray 9 (S62: YES), then in S64 the CPU 21 determines whether the scanner 3 is in use. If the scanner 3 is currently being used for the copy task (S70) or the scan task (S90) described later (S64: YES), then the CPU 21 ends the facsimile transmission task.

However, if the scanner 3 is not occupied (S64: NO), then in S66 the CPU 21 reads the document with the scanner 3 and stores the scanned image data in the image memory area 23c, together with various information on the image (such as the data size, height and width of the page, and data format). When a prescribed amount of image data (a data amount with which the multifunction device 1 can begin JPEG compression) has been stored or when the entire document has been scanned (S6A: YES), then in S67 the CPU 21 performs a compressed data acquisition process to compress the image data stored in the image memory area 23c into the JPEG format to produce compressed data. In S68 the CPU 21 transfers the compressed data to the NCU 31 and modem 32 (see FIG. 3) to be transmitted to the destination facsimile device. Subsequently, the CPU 21 repeats the process from S68 until the entire original has been scanned (S69: NO). Once data reception is completed (S69: YES), the CPU 21 ends the facsimile transmission task. By compressing data to be transmitted in the JPEG format with this facsimile transmission task, it is possible to reduce the amount of data being transmitted, thereby shortening the transmission time, even for color image data. The compressed data acquisition process of S67 will be described in greater detail below with reference to FIG. 11A.

Figure 8:
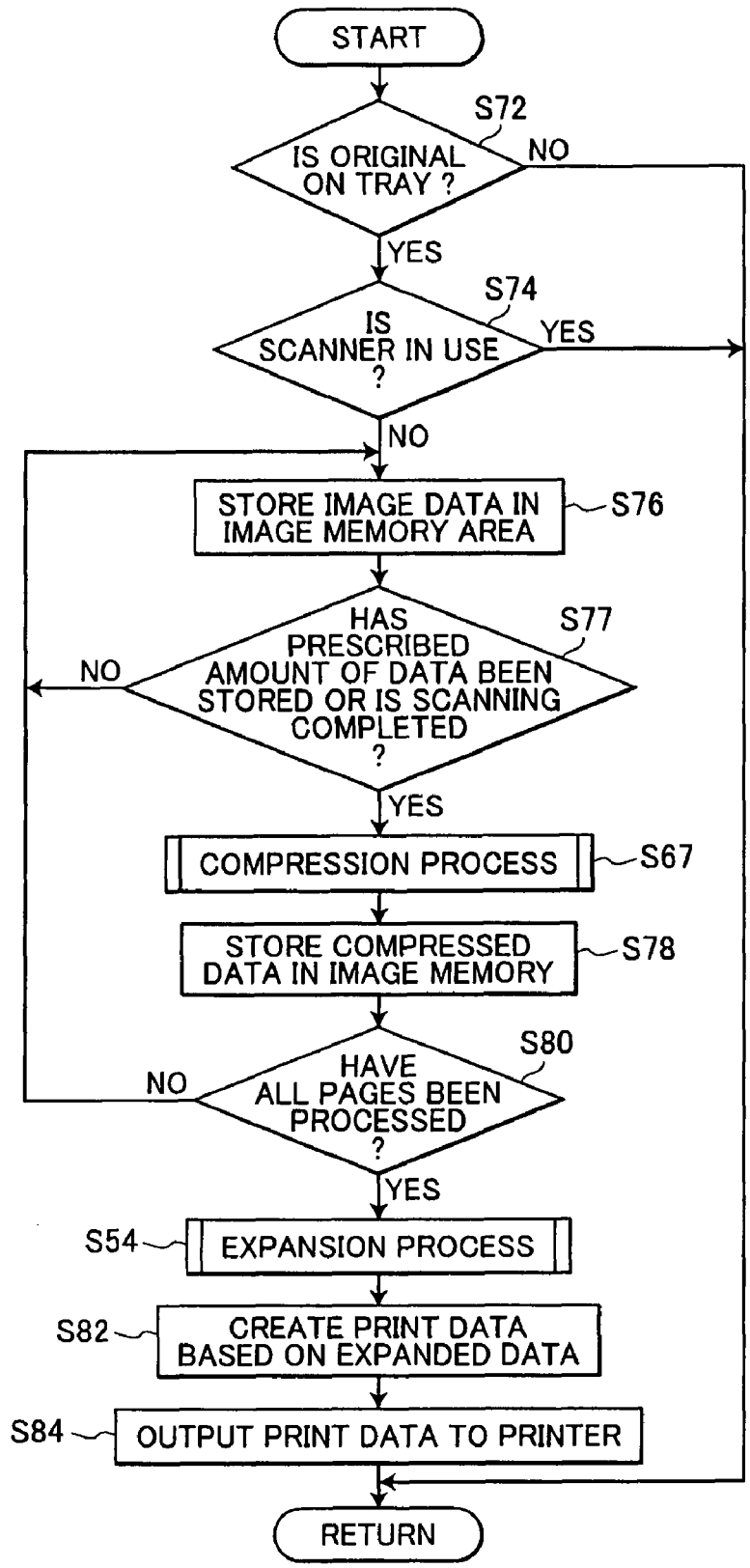
FIG. 8 is a flowchart illustrating a copy task.

Next, the copy task (S70) will be described with reference to FIG. 8. At a timing for executing the copy task, the CPU 21 confirms the event message for the copy task and executes the task when an event message exists.

In S72 the CPU 21 determines whether an original document is on the document reading base 6 or in the document tray 9. If a document is not on the document reading base 6 nor in the document tray 9 (S72: NO), then the CPU 21 ends the copy task.

However, if the original is on the document reading base 6 or in the document tray 9 (S72: YES), then in S74 the CPU 21 determines whether the scanner 3 is in use. If the scanner 3 is currently being used for the facsimile transmission task (S60) or the scan task (S90) described later (S74: YES), then the CPU 21 ends the copy task.

However, if the scanner 3 is not in use (S74: NO), then in S76 the CPU 21 scans the original with the scanner 3, creates image data, and stores the acquired image data in the image memory area 23c together with various information on the image, such as the data size, height and width of the page, and the data format. When the CPU 21 has stored the prescribed amount of image data or has read the entire original (S77: YES), then in S67 the CPU 21 executes the compressed data acquisition process to compress image data stored in the image memory area 23c into the JPEG format. In S78 the CPU 21 stores this compressed data in the image memory area 23c together with the various information on the image. By storing compressed data in this way, it is possible to conserve the amount of area available in the image memory area 23c. Next, the CPU 21 determines in S80 whether all pages of the original have been read and returns to S60 when reading is not completed (S80: NO).

When all pages of the original have been read (S80: YES), in S54 the CPU 21 performs the expanded data acquisition process for expanding the data stored in the image memory area 23c to produce the expanded data. In S82 the CPU 21 generates print data based on the expanded data, and in S84 outputs the data to the printer 2 to form images on recording paper. Subsequently, the process ends.

Based on operational settings of the multifunction device 1, the process for creating print data in S82 may be a process for creating data for a reduced print, a process for creating data for printing a plurality of copies based on the same image data, or a process for creating data for an N-in-1 print for arranging and printing images of a smaller size than a normal printing operation on a single sheet of recording paper based on data for forming images on a plurality of sheets of recording paper in a normal printing operation. In this case, as in the thumbnail display process (see FIG. 13) and the index printing process (see FIG. 14) described later, the CPU 21 begins expanding compressed data in the expanded data acquisition process of S67 required for generating print data sequentially in the compression/expansion task, acquires expanded data sequentially, and generates print data based on this expanded data.

In order to generate print data for reduced printing, printing a plurality of copies, or N-in-1 printing, the process for creating print data requires memory for storing data acquired when scanning the original in addition to memory for storing the created print data. It is particularly convenient to store compressed data at this time to conserve the amount of available area in the image memory area 23c.

Next, the scan task (S90) will be described with reference to FIG. 9. At a timing for executing the scan task (S90), the CPU 21 confirms the event message for the scan task and executes the task when an event message exists. In this embodiment, the user specifies the destination device for transmitting data scanned by the scanner 3 prior to pressing the start key.

In S92 the CPU 21 determines whether an original document is on the document reading base 6 or in the document tray 9. If a document is not on the document reading base 6 nor in the document tray 9 (S92: NO), then the CPU 21 ends the scan task.

However, if the original is on the document reading base 6 or in the document tray 9 (S92: YES), then in S94 the CPU 21 determines whether the scanner 3 is in use. If the scanner 3 is currently being used for the facsimile transmission task (S60) or the copy task (S70) (S94: YES), then the CPU 21 ends the scan task.

However, if the scanner 3 is not in use (S94: NO), then in S96 the CPU 21 scans the original with the scanner 3, creates image data, and stores the acquired image data in the image memory area 23c together with various information on the image, such as the data size, height and width of the page, and the data format. When the CPU 21 has stored the prescribed amount of image data or has read the entire original (S97: YES), then in S67 the CPU 21 executes the compressed data acquisition process to compress the data into the JPEG format. In S98 the CPU 21 stores the compressed data in the image memory area 23c together with the various information on the image. Next the CPU 21 determines in S100 whether all pages of the original have been read, and returns to S96 when reading is not completed (S100: NO).

When all pages in the original have been scanned (S100: YES), in S102 the CPU 21 transfers the compressed data to the destination device and ends the scan task. Since the transferred data is compressed in the JPEG format in the scan task, it is possible to reduce the amount of data being transferred, thereby shortening the transfer time, even when transferring color image data.

Figure 9:
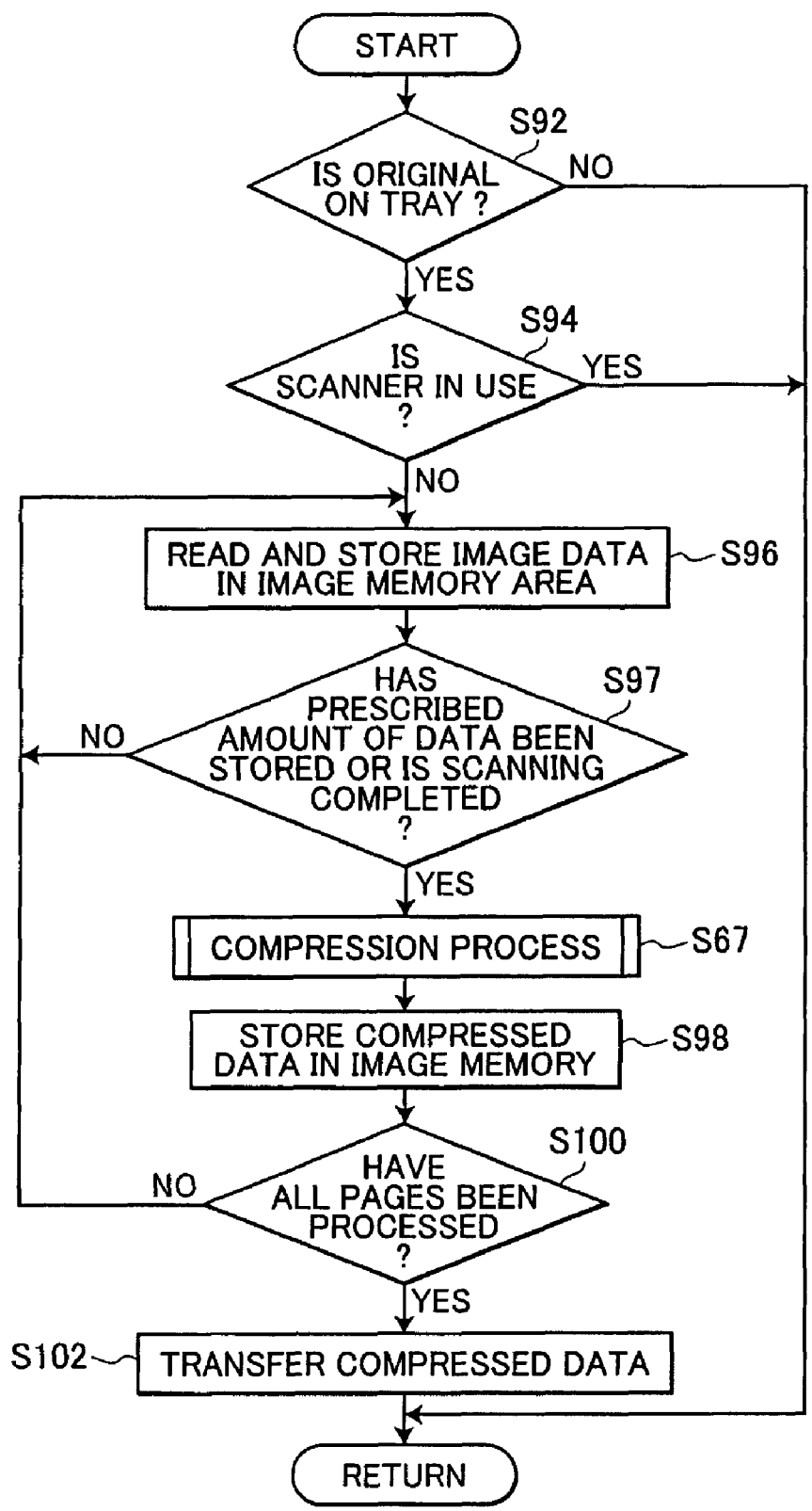
FIG. 9 is a flowchart illustrating a scan task.

The flowchart in FIG. 9 conceptually illustrates the copy task. Specifically, S92-S96 are steps for generating an event message for a reading task and for executing the corresponding process. S97 is a step in which the CPU 21 recognizes the event message that the reading task generated when the reading task stores the prescribed amount of data or completes reading of the original. The CPU 21 then is performs to resume the suspended copy task. S67 implements processes corresponding to the compression/expansion task and the copy task.

S98 is a step in which the copy task stores data acquired in S67 in memory.

S100 is a step in which the CPU 21 recognizes the event message generated after the reading task completes reading and the CPU 21 resumes the suspended scan task. The CPU 21 reaches a YES determination in S100 if the original has already been read.

Figure 10:
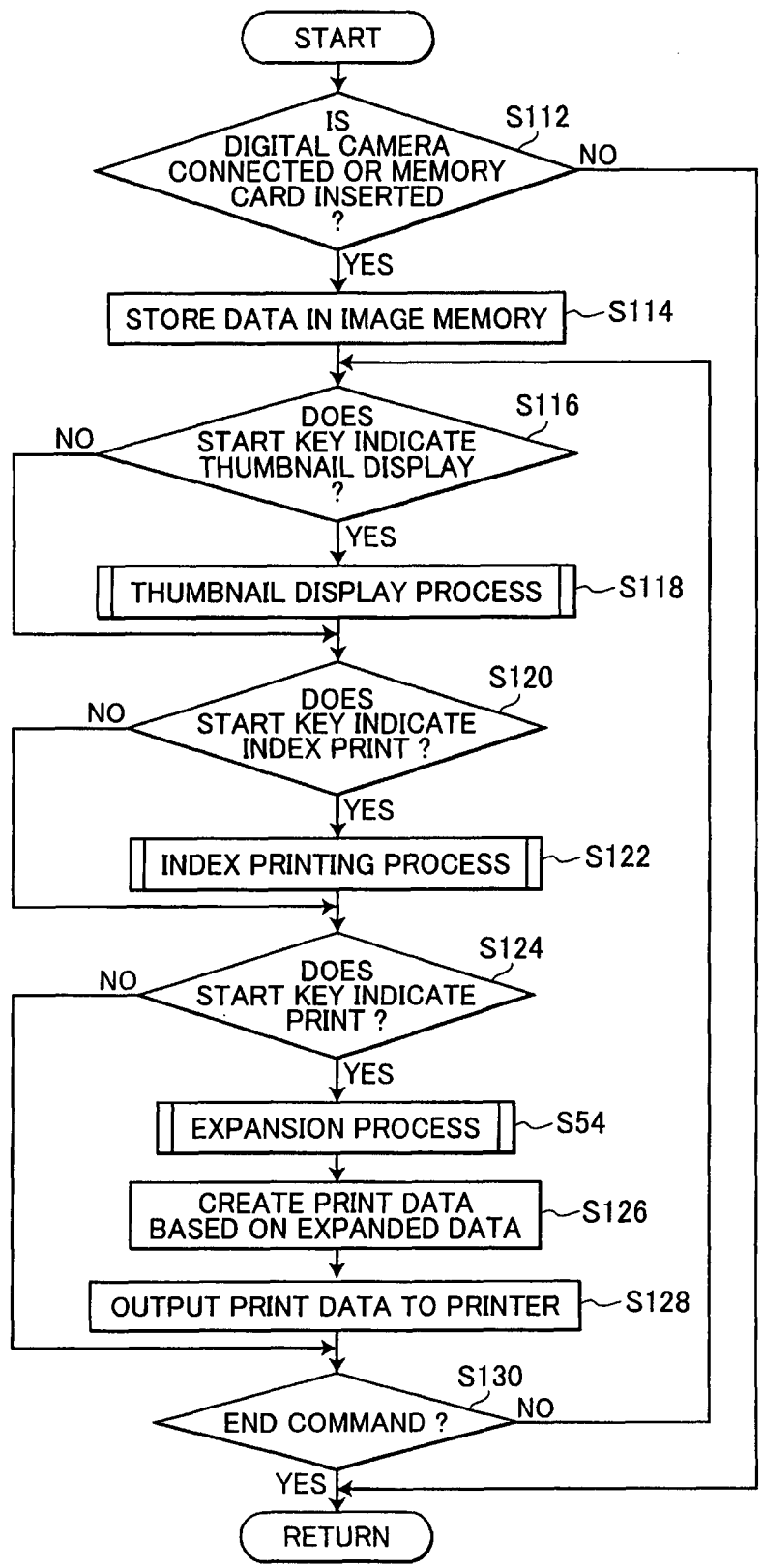
FIG. 10 is a flowchart illustrating a digital camera output task.

Next, the digital camera output task of S110 will be described with reference to FIG. 10. If a digital camera is not connected to the multifunction device 1 and a memory is not inserted in the card slots 72 (S112: NO), then the CPU 21 ends the digital camera output task.

However, if a digital camera is connected to the multifunction device 1 or if a memory card is inserted in one of the card slots 72 (S112: YES), then in S114 the CPU 21 reads data from the digital camera, or memory card and stores the data in the image memory area 23c. In this embodiment, data read from a digital camera or memory card is compressed in the JPEG format and includes one or more image files managed as a single dataset.

In this embodiment, the start keys provided on the control panel 4 includes a thumbnail display start key for displaying a list of thumbnails (reduced images) corresponding to each of the read image files on the LCD 41, an index print start key for printing a plurality of thumbnail images on a single sheet of recording paper, and an image print start key for forming an image based on each image file. Of course, the multifunction device 1 need not be provided with a special key for each operation, but may be configured to accept a prescribed key operation as the start key operation.

In S116 the CPU 21 determines whether the start key pressed by the user is the thumbnail display start key. If so (S116: YES), then in S118 the CPU 21 executes the thumbnail display process to display thumbnail images on the LCD 41 correspond to each of the image files included in the data read and stored in S114. The thumbnail display process of S118 will be described later in greater detail with reference to FIG. 13. However, if the pressed start key was not the thumbnail display start key (S116: NO), then the CPU 21 skips S118.

In S120 the CPU 21 determines whether the start key pressed by the user is the index print start key. If so (S120: YES), then in S122 the CPU 21 executes the index printing process. The index printing process will be described later in greater detail with reference to FIG. 14. However, if the pressed start key was not the index print start key (S120: NO), then the CPU 21 skips S122.

In S124 the CPU 21 determines whether the start key pressed by the user is the image print start key. In this embodiment, the user specifies an image file to be printed by the printer 2 when pressing the image print start key.

In S54 the CPU 21 expands the user-specified image file in the expanded data acquisition process. In S126 the CPU 21 creates print data based on the expanded image data. In S128 the CPU 21 outputs the print data to the printer 2, and the printer 2 forms an image on recording paper.

Based on operational settings of the multifunction device 1, the process for creating print data in S126 may be a process for creating data for a reduced print, a process for creating data for printing a plurality of copies based on the same image data, or a process for creating data for an N-in-1 print for arranging and printing images of a smaller size than a normal printing operation on a single sheet of recording paper based on data for forming images on a plurality of sheets of recording paper in a normal printing operation. While the user has not inputted an instruction to end the digital camera print mode (S130: NO), the CPU 21 repeats the process described above from S116. If a start key is pressed while repeating the above loop, the CPU 21 executes the process corresponding to the pressed start key. When the user has inputted an instruction to end the digital camera print mode (S130: YES), the CPU 21 ends the digital camera output task.

Next, the compressed data acquisition process of S67 will be described with reference to FIG. 11A. In S672 the CPU 21 executes the first control function of S140 with a command to start the compression process, a storage address in the image memory area 23c (see FIG. 3) for the data targeted for compression, and a compression process ID as arguments.

In S674 the CPU 21 executes the first control function of S140 with an address request requesting the storage address of the compressed data, and the compression process ID as arguments. Upon receiving this data in the first control function of S140, the CPU 21 references the compression process based on the ID and returns the requested storage address of the compressed data when the compression process indicated by the ID is completed.

When the storage address of the compressed data is acquired from the first control function of S140 (S676: YES), in S678 the CPU 21 reads the compressed data from the storage address. Through the compressed data acquisition process of S67 it is possible to command the compression of image data stored in the image memory area 23c and to acquire compressed data based on this command.

Next, the expanded data acquisition process of S54 will be described with reference to FIG. 11B. In S542 the CPU 21 executes the first control function of S140 with a command to start the expansion process, a storage address in the image memory area 23c for data targeted for the expansion process (including image files targeted for the expansion process), and an expansion process ID as arguments.

In S544 the CPU 21 executes the first control function of S140 with an address request requesting the storage address of the expanded image data and the expansion process ID as arguments. Upon receiving this data in the first control function, the CPU 21 references the expansion process based on the ID and returns the requested storage address for the expanded image data upon completing the expansion process corresponding to the ID.

Upon acquiring the storage address from the first control function for the expanded image data (S546: YES), in S548 the CPU 21 reads the expanded image data from the storage address. Through this expanded data acquisition process, it is possible to issue a command to expand data stored in the image memory area 23c and obtain expanded image data based on this command.

Figure 12:
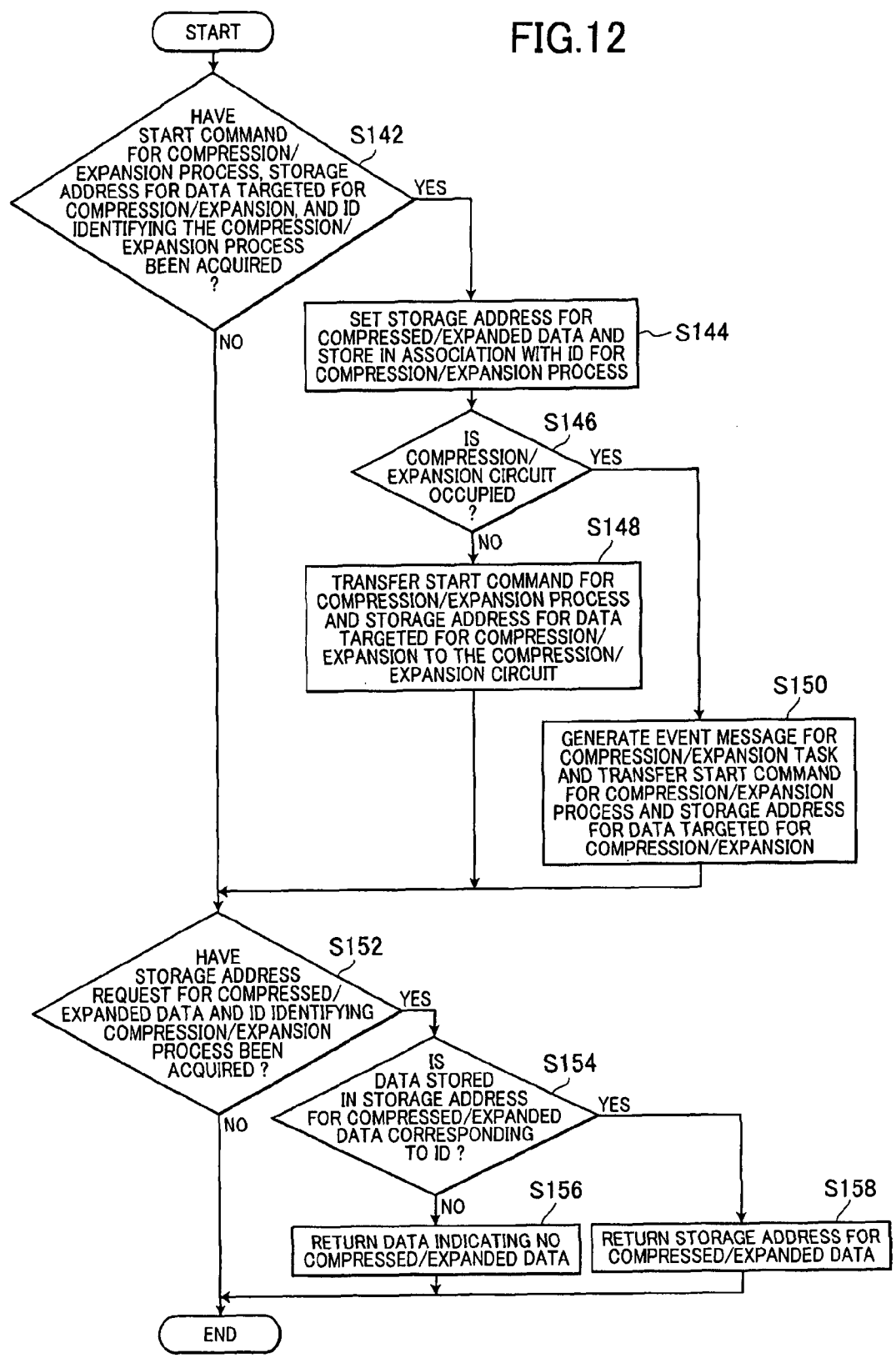
FIG. 12 is a flowchart illustrating a first control function.

Next, the first control function of S140 will be described with reference to FIG. 12.

In S142 the CPU 21 determines whether a start command for an compression or expansion process, a storage address for data targeted for compression or expansion, and an ID for the compression or expansion process has been obtained. If this data has been obtained (S142: YES), then in S144 the CPU 21 sets the storage address for the data to be compressed or expanded, and stores this address in the RAM 23 in association with the ID for the compression or expansion process.

In S146 the CPU 21 determines whether the compression/expansion circuit 73 is occupied (i.e., whether the compression/expansion circuit 73 is currently performing a data compression process or expansion process). If the compression/expansion circuit 73 is not occupied (S146: NO), then in S148 the CPU 21 transfers the start command for the compression or expansion process and the storage address for data targeted for compression or expansion to the compression/expansion circuit 73. Upon receiving this data, the compression/expansion circuit 73 acquires the data targeted for compression or expansion from the image memory area 23c via the DMA controller 74. Next, the compression/expansion circuit 73 compresses the acquired data in the JPEG format or expands data acquired in the JPEG format to image data and stores the compressed or expanded data at the storage address determined in S144.

However, if the compression/expansion circuit 73 is occupied (S146: YES), then in S150 the CPU 21 generates an event message for a compression or expansion task TS and transfers the start command for the compression/expansion process and the storage address for data to be compressed or expanded to this task TS. At the timing for performing the compression or expansion task TS, the CPU 21 confirms the event message and performs the compression or expansion task TS if an event message has been generated. The CPU 21 executes the compression or expansion task TS according to the compression/expansion program 22*a* (see FIG. 3). By executing this task, the CPU 21 can compress the image data in the JPEG format or expand data from the compressed JPEG format. Next, the CPU 21 stores the compressed or expanded data at the storage address determined in S144.

As described above, the processing time of the CPU 21 is divided and appropriated to other processes (or tasks) including this compression/expansion task TS. The processing speed of the CPU 21 in the compression or expansion process of the compression/expansion task TS tends to be slower than the processing speed of the compression/expansion circuit 73, which is a circuit dedicated to compression or expansion processes.

Accordingly, in this embodiment, the compression/expansion circuit 73 is used to perform the compression or expansion processes when not occupied, thereby giving priority to using the compression/expansion circuit 73, which can perform the compression or expansion processes more quickly and, therefore, more efficiently. Further, since the CPU 21 is not appropriated to the compression or expansion process in the compression/expansion task TS when the compression/expansion circuit 73 executes this process, there is no drop in processing speed for other CPU-related processes, thereby effectively improving the processing efficiency of the overall device. By using the CPU 21 when the compression/expansion circuit 73 is occupied, the compression or expansion process can be started without waiting for the compression/expansion circuit 73 to complete its process. Hence, if one function is using the JPEG processing hardware, another function can perform a JPEG compression/expansion process without requiring an excessive amount of time to complete the process. Hence, this method prevents a processing delay of a degree that can cause the user discomfort.

In S152 the CPU 21 determines whether a storage address request for compressed or expanded data and an ID identifying the compression or expansion process has been acquired. If this data has not been acquired (S152: NO), then the process ends. However, if this data has been acquired (S152: YES), then in S154 the CPU 21 confirms the storage address of compressed or expanded data corresponding to the ID and determines whether compressed or expanded data is stored at this address. If there is no compressed or expanded data stored at this address (S154: NO), then in S156 the CPU 21 returns data indicating that there is no compressed or expanded data.

However, if compressed or expanded data is stored at the storage address corresponding to the ID (S154: YES), then in S158 the CPU 21 returns the storage address for this compressed or expanded data. As a result, in the compressed data acquisition process of S67 (see FIG. 11A) and the expanded data acquisition process of S54 (see FIG. 11B), the CPU 21 can acquire compressed or expanded data by reading the data from the storage address received from the first control function of S140.

Next, the thumbnail display process of S118 will be described with reference to FIG. 13.

Figure 13:
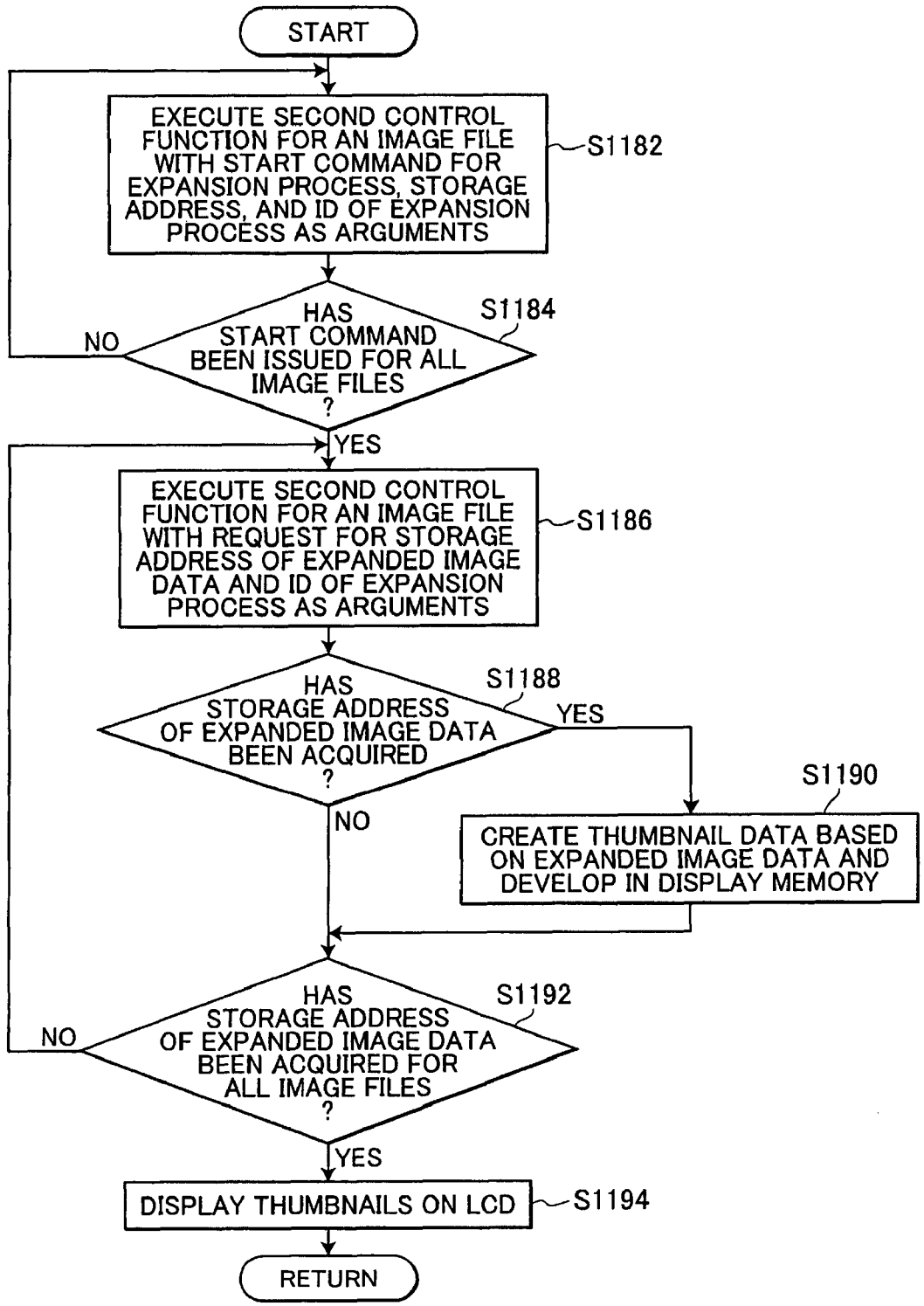
FIG. 13 is a flowchart illustrating a thumbnail display process.

In S1182 of the thumbnail display process shown in FIG. 13, the CPU 21 executes a second control function of S200 on one of the image files included in the data read from a digital camera or memory card, with a command for starting the expansion process, a storage address in the image memory area 23*c* for the image file, and an ID identifying the expansion process as arguments. By passing the storage address of the image memory area 23*c*, the second control function can read the image file targeted for the expansion process from the image memory area 23*c*. By passing the ID, the second control function can manage the expansion process on the image file according to this ID.

In S1184 the CPU 21 determines whether the start command for the expansion process has been issued for all image files included in the data read from the digital camera or the memory card. If a start command for starting the expansion process has not been given for all image files (S1184: NO), then the CPU 21 returns to S1182.

If a start command for the expansion process has been issued for all image files (S1184: YES), then in S1186 the CPU 21 executes the second control function on one image file with an address request requesting the storage address of the expanded image data and the ID identifying the expansion process of this image file as arguments. Upon receiving this data, the second control function references the expansion process based on the ID and returns the storage address for the expanded image data if the requested expansion process is completed.

When the CPU 21 acquires the storage address for the expanded image data from the second control function (S1188: YES), then in S1190 the CPU 21 reads the expanded image data from the storage address, creates thumbnail data based on this image data, and develops the images in the display memory area 23*d*. Next, the CPU 21 repeats the process from S1186 until the storage addresses of expanded image data have been obtained for all image files. If a storage address is not obtained from the second control function for expanded image data (S1188: NO), then the CPU 21 skips S1190.

When storage addresses for expanded image data have been obtained for all image files after repeatedly executing the process described above (S1192: YES), then in S1194 the CPU 21 outputs thumbnail data developed in the display memory area 23*d* so that the LCD controller 28 can display the thumbnails on the LCD 41. Subsequently, the CPU 21 ends the thumbnail display process. When an array of thumbnails (reduced images) is displayed on the LCD 41 through the thumbnail display process described above, the user can easily confirm what image files are stored in the digital camera or memory card.

Next, the index printing process of S122 will be described with reference to FIG. 14.

Figure 14:
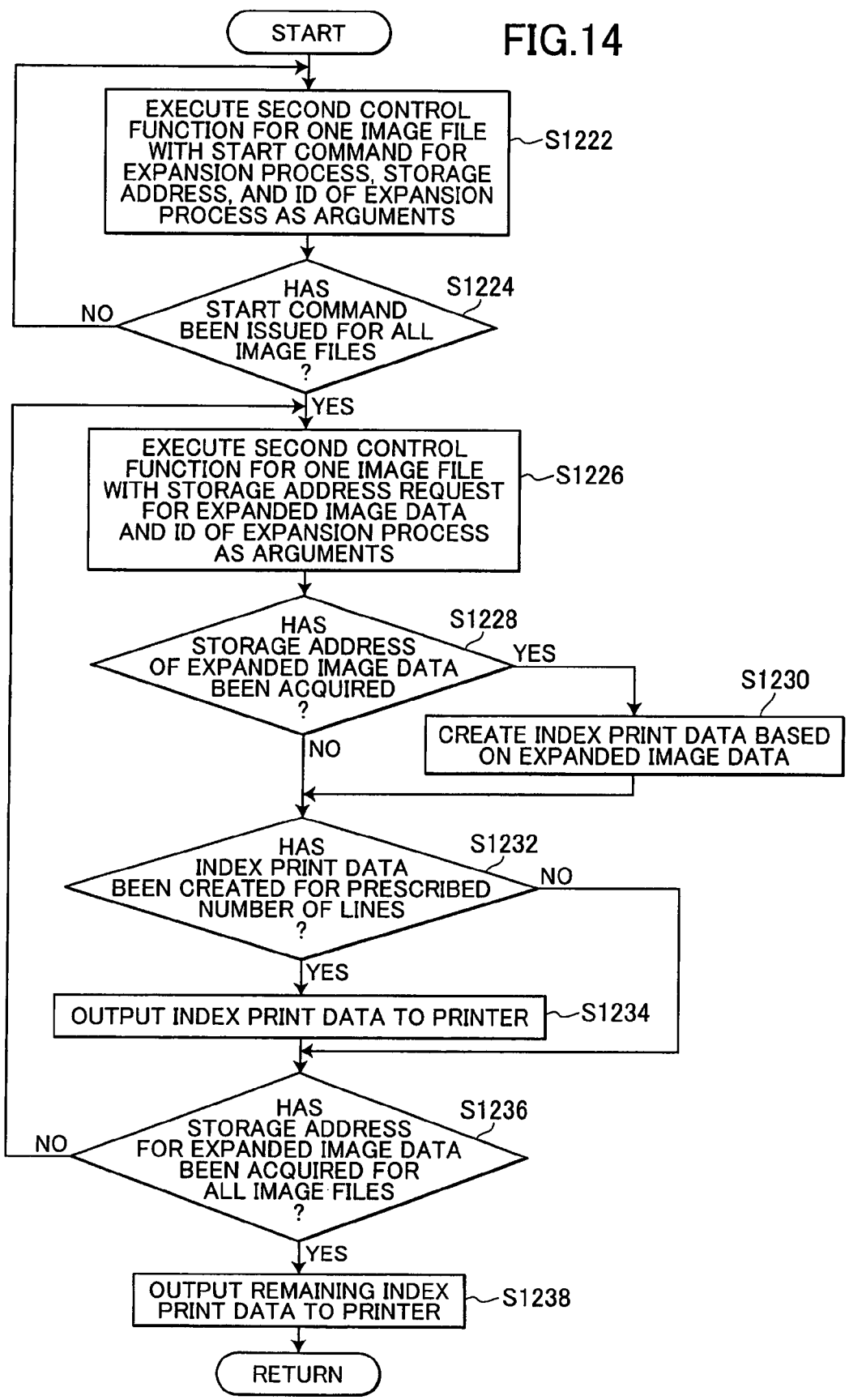
FIG. 14 is a flowchart illustrating an index printing process.

In S1222 of FIG. 14, the CPU 21 executes the second control function of S200 on one of the image files included in data read from the digital camera or a memory card, with a start command for starting the expansion process, a storage address in the image memory area 23*c* for the image file, and an ID identifying the expansion process as arguments.

In S1224 the CPU 21 determines whether a start command for the expansion process has been issued for all image files included in the data. If a start command has not been issued for all image files (S1224: NO), then the CPU 21 returns to S1222.

When a start command for the expansion process has been issued for all image files (S1224: YES), then in S1226 the CPU 21 executes the second control function on one image file with an address request requesting the storage address of the expanded image data and the ID identifying the expansion process for this image file as arguments.

When the CPU 21 acquires the storage address for expanded image data from the second control function (S1228: YES), in S1230 the CPU 21 reads the expanded image data from the storage address and creates index print data based on this image data. However, if the CPU 21 does not acquire the storage address of the expanded image data from the second control function (S1228: NO), then the CPU 21 skips the process in S1230.

If the CPU 21 has created index print data for a prescribed line worth (S1232: YES), in S1234 the CPU 21 outputs the line worth of index print data to the printer 2. However, if the prescribed line worth of index print data has not yet been accumulated (S1232: NO), the CPU 21 skips the process in S1234.

In this way, the CPU 21 repeats the process from S1226 until storage addresses for the expanded image files have been obtained for all image files. After repeatedly performing the process until storage addresses have been acquired for all image files (S1236: YES), in S1238 the CPU 21 outputs the remaining index print data to the printer 2 so that the printer 2 can form an image of this data on recording paper. Subsequently, the CPU 21 ends the index printing process.

Next, the second control function of S200 will be described with reference to FIG. 15.

Figure 15:
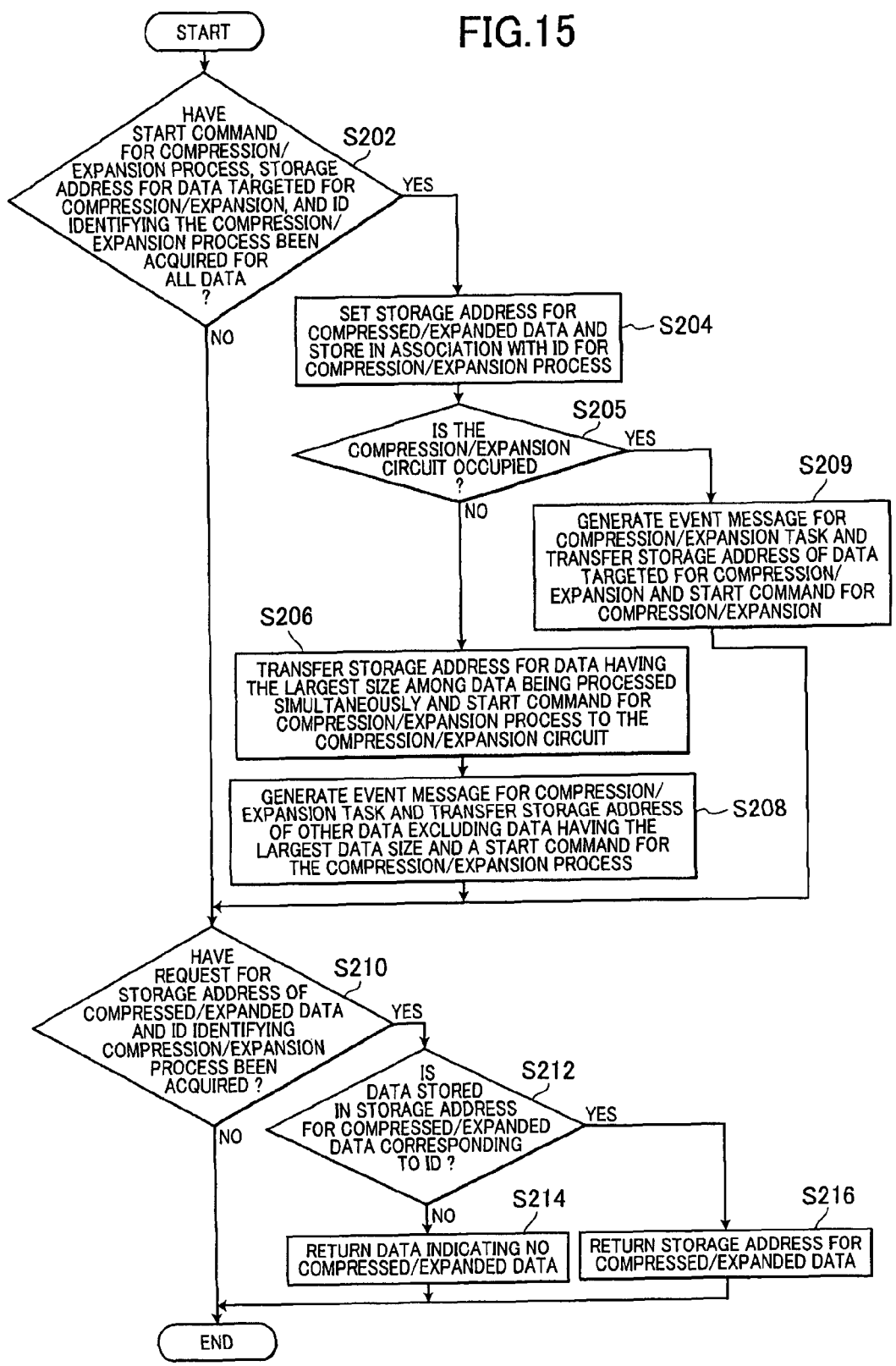
FIG. 15 is a flowchart illustrating a second control function.

S202 of FIG. 15 the CPU 21 determines whether a start command for starting the compression or expansion process, a storage address for the data targeted for compression or expansion, and an ID identifying the compression or expansion process has been obtained for all data (or all image files). If so (S202: YES), in S204 the CPU 21 sets the storage address for the compressed or expanded data for each data element (or each image file) and stores these storage addresses in the RAM 23 in correspondence with the respective ID identifying the compression or expansion process.

In S205 the CPU 21 determines whether the compression/expansion circuit 73 is occupied. If the compression/expansion circuit 73 is not currently performing a data compression or expansion process (S205: NO), then in S206 the CPU 21 transfers the storage address for the data segment having the largest size among all data (or image files) for which a start command has been issued to begin a compression or expansion process, and the start command for starting the compression or expansion process to the compression/expansion circuit 73. Since the size of each data segment targeted for the compression or expansion process is managed in a data control memory (not shown) of the RAM 23, the CPU 21 can determine the data element having the largest size by referencing this data control memory.

Next, the CPU 21 appropriates the compression or expansion task TS to all data elements other than the data having the largest size and generates an event message for this compression/expansion task TS. In S208 the CPU 21 transfers the storage addresses for these data segments and a start command for starting the compression or expansion process to the compression/expansion task TS for which the image message has been generated.

As described above, since the segment having the largest size is processed by the compression/expansion circuit 73, and other data segments than the data segment having the largest size are processed by the CPU 21 with the event message, the multifunction device 1 can improve the overall processing speed. In this embodiment, data size denotes the amount of data that can be expressed in units of bits.

However, if the compression/expansion circuit 73 is occupied (S205: YES), then the second control function 200 appropriates the compression/expansion task TS to all data for which a start command has been issued and generates an event message for the compression/expansion task TS executed by the CPU 21. In S209, according to the event message, the CPU 21 starts the compression/expansion task TS for which the event message has been generated, while referring to the storage address for each data element.

If the CPU 21 acquires a storage address request for compressed or expanded data and an ID identifying the compression or expansion process from another process (or task) such as the thumbnail display process or index printing process (S210: YES), then in S212 the CPU 21 determines whether data is stored in the storage address for the compressed or expanded data corresponding to the acquired ID. If compressed or expanded data has not yet been stored at this storage address (S212: NO), then in S214 the CPU 21 returns data indicating that compressed or expanded data does not exist at the address and subsequently ends the process. However, when compressed or expanded data is stored at the storage address (S212: YES), then in S216 the CPU 21 returns the storage address for the compressed or expanded data and subsequently ends the process.

In the thumbnail display process of S118 (see FIG. 13) or the index printing process of S122 (see FIG. 14) described above, the CPU 21 can read and acquire compressed or expanded data from the storage address received from the second control function.

Hence, when there is a plurality of data elements to be processed simultaneously, the second control function uses the compression/expansion circuit 73 to process the data element having the largest size and uses the CPU 21 to process the other data elements. Accordingly, priority is given to the compression/expansion circuit 73 for processing data having the largest size and, therefore, requiring the most processing time, thereby more effectively using both the compression/expansion circuit 73 and CPU 21 and performing compression or expansion of a plurality of data elements in parallel. Hence, this process can shorten the time required for data compression or expansion.

With the multifunction device 1 according to the first embodiment, the first control function of S140 appropriates compression of image data in the JPEG format or expansion of data from the JPEG format to the CPU 21 or the compression/expansion circuit 73. Accordingly, either the CPU 21 or the compression/expansion circuit 73 performs the compression or expansion process on data for one inputted data file. Since the other structure is not occupied at this time, this structure can perform a compression or expansion process on other inputted data in parallel. Hence, while data inputted first is undergoing a compression or expansion process, a compression or expansion process can be started on data inputted next without waiting to complete the first process, thereby improving the overall processing speed. Further, since this improvement on processing speed is achieved without providing a plurality of compression/expansion circuits 73, the multifunction device 1 of the first embodiment can suppress an increase in device size and an increase in cost.

Further, since the CPU 21 is directed to execute the compression process or expansion process for the compressed data acquisition process of S67 or the expanded data acquisition process of S54 in another function when the compression/expansion circuit 73 is occupied, the CPU 21 can be used to begin the compression process or expansion process without waiting for the compression/expansion circuit 73 to complete its compression or expansion process. Accordingly, the multifunction device 1 of the first embodiment can shorten the processing time required for the compressed data acquisition process or expanded data acquisition process of each function, thereby improving the processing time of each function and implementing each function without causing the user discomfort, even when implementing a plurality of functions simultaneously.

Next, a multifunction device 1 according to a second embodiment of the present invention will be described with reference to FIGS. 16 and 17.

In the first control function of S140 according to the first embodiment described above, compression or expansion processes are assigned to the compression/expansion circuit 73 and CPU 21 based on whether the compression/expansion circuit 73 is in use. In contrast, the multifunction device 1 according to the second embodiment pre-stores data indicating functions that can use the compression/expansion circuit 73 and functions that cannot use the compression/expansion circuit 73 and assigns processes to the compression/expansion circuit 73 and CPU 21 based on this data.

FIG. 16 conceptually illustrates a resource usage table 24a stored in the EEPROM 24 in the multifunction device 1 according to the second embodiment. As shown in FIG. 16, data indicating whether the compression/expansion circuit 73 can be used or not is stored in the resource usage table 24a in correlation with each of the facsimile reception function, facsimile transmission function, copy function, scan function, and digital camera print function. The data stored in the resource usage table 24a is equivalent to resource usage data. Based on this resource usage data, the compression/expansion circuit 73 is used for compressing or expanding data employed in functions that can use the compression/expansion circuit 73 (the copy function, scan function, and digital camera print function in this embodiment), while the CPU 21 compresses or expands data used in functions that cannot use the compression/expansion circuit 73 (the facsimile reception function and facsimile transmission function in this embodiment).

Since the facsimile reception function and facsimile transmission function have less disadvantage than other functions, even when the processing time is increased, the compression/expansion circuit 73 is not used for these functions and is left available for the other functions.

As described in the first embodiment, the facsimile reception function receives and expands data.

In this situation, if the data transmission rate based on the facsimile procedure is slow, using the compression/expansion circuit 73 to perform the expanded data acquisition process of S54 rapidly has little benefit since the multifunction device 1 cannot receive fast enough to keep up with the compression/expansion circuit 73, resulting in the compression/expansion circuit 73 waiting for the next data to be received. Hence, the overall processing speed is not greatly improved when using the compression/expansion circuit 73. Hence, by always using the CPU 21 for the expanded data acquisition process of S54 in the facsimile reception task of S50, the multifunction device 1 according to the second embodiment increases the probability of the compression/expansion circuit 73 being used for other functions, whereby the overall processing speed can be improved.

Figure 17:
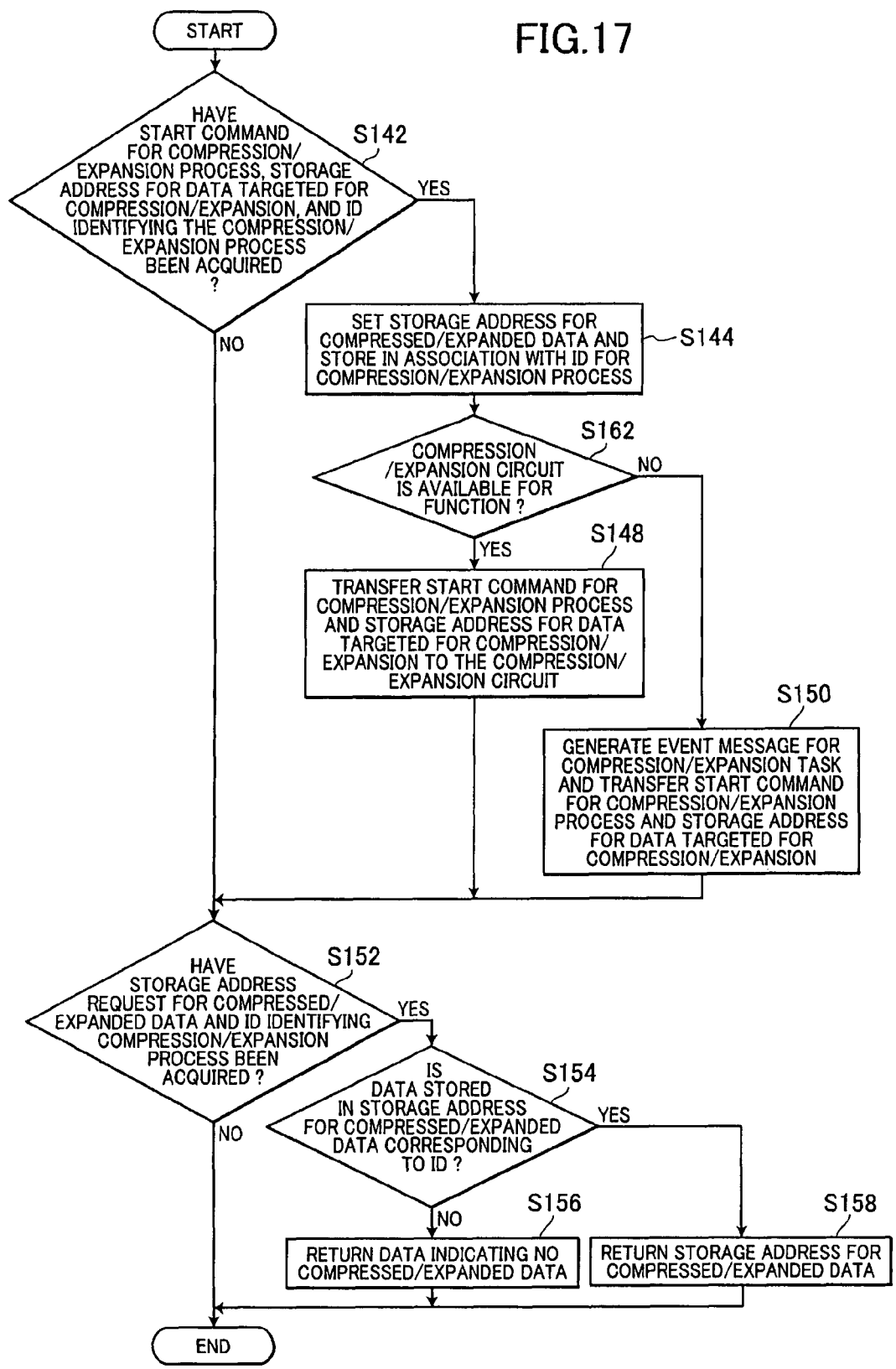
FIG. 17 is a flowchart illustrating operations executed by a first control function.

The first control function of S160 shown in FIG. 17 is a process executed in place of the first control function of S140 (see FIG. 12) according to the first embodiment. Steps in the first control function shown in FIG. 17 that are identical to the steps in the first control function according to the first embodiment have been designated with the same step numbers to avoid duplicating description.

In the first control function shown in FIG. 17, when the CPU 21 acquires the start command for a compression or expansion process, a storage address of data targeted for compression or expansion, and an ID identifying the compression or expansion process (S142: YES), then in S144 the CPU 21 sets the storage address for compressed or expanded data and stores this address in association with the ID. In S162 the CPU 21 determines whether the process (function) that issued the start command for the compression or expansion process is a function that can use the compression/expansion circuit 73. The CPU 21 can make this determination based on the resource usage data stored in the resource usage table 24a (see FIG. 16). If the process that issued the start command is a function that can use the compression/expansion circuit 73 (S162: YES), then in S148 the CPU 21 transfers the start command for the compression or expansion process and the storage address for the data targeted for compression or expansion to the compression/expansion circuit 73. Upon receiving this data, the compression/expansion circuit 73 acquires the data targeted for compression or expansion that is stored in the image memory area 23c via the DMA controller 74 and compresses the acquired data according to the JPEG format or expands the acquired JPEG data.

However, when the process that issued the start command is not a function that can use the compression/expansion circuit 73 (S162: NO), then in S150 the first control function 160 generates an event message for the compression/expansion task TS by the CPU 21 and the CPU 21 starts the compression/expansion process, referring to the storage address for the data targeted for compression or expansion. By executing this compression/expansion task TS, the CPU 21 compresses image data into the JPEG format or expands JPEG data.

The multifunction device 1 according to the second embodiment determines whether the compression/expansion circuit 73 or the CPU 21 is to perform compression or expansion in the compressed data acquisition process of S67 or the expanded data acquisition process of S54 for each function based on the resource usage data, thereby restricting usage of the compression/expansion circuit 73 to prescribed functions. Accordingly, the multifunction device 1 can use the compression/expansion circuit 73 for functions that realize a great improvement in processing speed by using the compression/expansion circuit 73, thereby improving the overall processing speed.

Next, a multifunction device 1 according to a third embodiment of the present invention will be described with reference to FIGS. 18 and 19, wherein like parts and steps are designated with the same reference numerals to avoid duplicating description.

In this embodiment, the multifunction device 1 assigns the compression or expansion processes based on whether the compression/expansion circuit 73 is occupied. Further, the multifunction device 1 uses a pre-stored priority for determining assignments.

FIG. 18 conceptually illustrates a priority table 24b stored in the EEPROM 24 in the multifunction device 1. As shown in FIG. 18, the priority table 24b stores priorities in association with each of the facsimile reception function, facsimile transmission function, copy function, scan function, and digital camera print function. Functions having a higher priority are given priority for processes assigned to the compression/expansion circuit 73. In this embodiment, the highest priority of "1" has been given to the digital camera print function. As described in the first embodiment, the digital camera print function can read data from a digital camera connected to the multifunction device 1 or from a memory card inserted in the card slot 72 and can expand this data. Since little time is required to read the data, using the compression/expansion circuit 73 to rapidly perform the expansion process can greatly improve the overall processing time. Since data read from a digital camera or a memory card is often photographs or other color data with a large data size, the processing speed achieved with the compression/expansion circuit 73 can have a great effect.

In contrast, when compressing data read by the scanner 3 in the facsimile transmission function, copy function, and scan function, the overall processing time is largely dependent on the reading time of the scanner 3. Accordingly, these functions are given a lower priority than the digital camera print function.

Further, since data is received according to a facsimile procedure with the facsimile reception function, the overall processing time is largely dependent on the speed of data reception. Hence, even though the compression/expansion circuit 73 can be used to improve the processing speed for compression, often the overall processing time is not improved greatly. Accordingly, the facsimile reception function is given the lowest priority in this embodiment. The priorities associated with functions in this embodiment may be changed based on the application or performance of the multifunction device 1.

Figure 19:
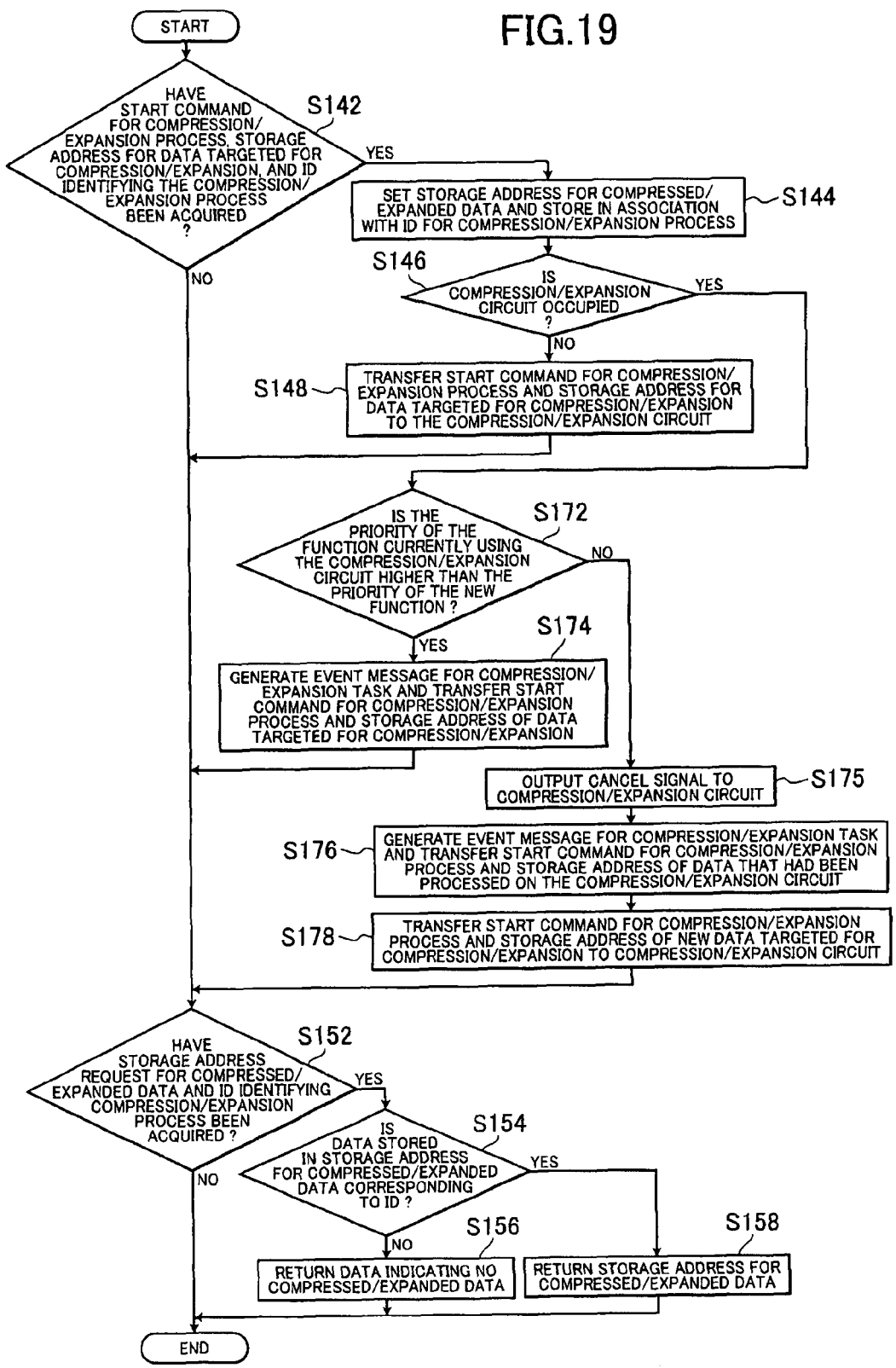

FIG. 19 is a flowchart illustrating steps in the first control function of S170 executed on the multifunction device 1 according to the third embodiment. The first control function shown in FIG. 19 is executed in place of the first control function of S140 according to the first embodiment (see FIG. 12). Steps in the first control function shown in FIG. 19 that are identical to the steps in the first control function according to the first embodiment have been designated with the same step numbers to avoid duplicating description.

In S146 of FIG. 19, the CPU 21 determines whether the compression/expansion circuit 73 is occupied. Since the CPU 21 executes a plurality of tasks in parallel, as described above, the compression/expansion circuit 73 may be used for the compressed data acquisition process of S67 or the expanded data acquisition process of S54 for one of the tasks. If the compression/expansion circuit 73 is not occupied (S146: NO), then in S148 the CPU 21 uses the compression/expansion circuit 73 to perform the compression or expansion process.

However, when the compression/expansion circuit 73 is occupied (S146: YES), then in S172 the CPU 21 determines whether the priority of the function using data that is being processed by the compression/expansion circuit 73 is higher than the priority of the process (function) issuing the current start command for starting the compression or expansion process. Since the resource management memory area 23*b* (see FIG. 3) stores data indicating the function using the compression/expansion circuit 73, the CPU 21 can determine this function by referencing the resource management memory area 23*b*.

If the priority of the function using the compression/expansion circuit 73 to process data is higher than the priority of the function having data to be compressed or expanded in a new compression process (S172: YES), then in S174 the CPU 21 generates an event message for the compression/expansion task TS and transfers a start command for the compression or expansion process and the storage address for data targeted for compression or expansion to the compression/expansion task TS. As a result, the CPU 21 processes the data targeted for the new compression or expansion process through a compression/expansion task TS, while the compression/expansion circuit 73 continues processing the same data.

However, if the priority of the function using the compression/expansion circuit 73 to process data is lower than the priority of the process issuing a start command for starting a compression or expansion process (S172: NO), then in S175 the CPU 21 outputs a cancel signal to the compression/expansion circuit 73. Upon receiving this cancel signal from the CPU 21, the compression/expansion circuit 73 cancels or suspends the current process and resets.

In S176 the CPU 21 generates an event message for the compression/expansion task TS and transfers the start command for the compression or expansion process on data that has being processed on the compression/expansion circuit 73 and a storage address for this data to the compression/expansion task TS. As a result, the CPU 21 performs the cancelled (suspended) compression or expansion process from the start using the compression/expansion task TS.

In S178 the CPU 21 transfers a start command for a compression or expansion process performed on the new data and a storage address for this data to the compression/expansion circuit 73. As a result, the compression/expansion circuit 73 is used to process data for a function having a higher priority.

Hence, if the compression/expansion circuit 73 is processing data when other data needs to be processed, the multifunction device 1 according to the third embodiment uses the compression/expansion circuit 73 to process data used by the function having the higher priority and uses the CPU 21 to process all other data. Accordingly, the multifunction device 1 effectively uses both of the compression/expansion circuit 73 and CPU 21, and a plurality of data sets can be compressed or expanded in parallel, thereby reducing the time required to compress or expand data according to the JPEG format.

With the first control function of S170 according to the third embodiment, the multifunction device 1 cancels a compression process on the compression/expansion circuit 73 to compress image data into the JPEG format or an expansion process on the compression/expansion circuit 73 to expand data from the JPEG format on the condition that another function having data to be processed has a higher priority than the priority of the function currently using the compression/expansion circuit 73, and subsequently uses the compression/expansion circuit 73 to compress or expand data in the compressed data acquisition process of S67 or the expanded data acquisition process of S54 for the function having the higher priority. Therefore, the multifunction device 1 according to the third embodiment can reduce the processing time required for the compressed data acquisition process or expanded data acquisition process in the function having a higher priority.

Next, a multifunction device 1 according to a fourth embodiment will be described with reference to FIG. 20.

In the third embodiment described above, compression or expansion processes are allocated to the compression/expansion circuit 73 and the compression/expansion task TS performed by the CPU 21 according to a prestored priority when the compression/expansion circuit 73 is in use. In the fourth embodiment, compression or expansion processes are assigned to the compression/expansion circuit 73 with priority for functions having a larger data size when the compression/expansion circuit 73 is in use.

FIG. 20 is a flowchart illustrating steps in the first control function of S180 executed by the multifunction device 1 according to the fourth embodiment. The first control function of S180 shown in FIG. 20 is executed in place of the first control function of S140 described in the first embodiment (see FIG. 12). Steps in the first control function 180 shown in FIG. 20 identical to those in the first control function 170 described in the third embodiment have been designated with the same step numbers to avoid duplicating description.

In S146 of the flowchart in FIG. 20, the CPU 21 determines whether the compression/expansion circuit 73 is in use. If the compression/expansion circuit 73 is not in use (S146: NO), in S148 the CPU 21 uses the compression/expansion circuit 73 to perform the data compression or expansion process.

However, when the compression/expansion circuit 73 is occupied (S146: YES), then in S182 the CPU 21 determines whether the size of data being processed by the compression/expansion circuit 73 is greater than the size of the new data targeted for compression or expansion. Since a data control memory (not shown) of the RAM 23 stores data indicating which data size is greater, the CPU 21 can make this determination by referencing the data control memory.

If the size of data currently being processed with the compression/expansion circuit 73 is greater than the size of the new data targeted for compression or expansion (S182: YES), then in S174 the first control function 180 generates an event message for the compression/expansion task TS and transmits a start command for starting a compression or expansion process and the storage address of the data targeted for data compression or expansion to the compression/expansion task TS executed by the CPU 21. As a result, the CPU 21 processes the new data targeted for compression or expansion through the compression/expansion task TS, while the compression/expansion circuit 73 continues processing the same data.

However, if the size of data currently being processed by the compression/expansion circuit 73 is smaller than the size of new data (S182: NO), then in S175 the CPU 21 outputs a cancel signal to the compression/expansion circuit 73. Upon receiving this cancel signal from the CPU 21, the compression/expansion circuit 73 cancels the current process and resets.

In S176 the CPU 21 generates an event message for the compression/expansion task TS executed by the CPU 21 and transfers a start command for compressing or expanding data that has being processed on the compression/expansion circuit 73 and the storage address for this data to the compression/expansion task TS executed by the CPU 21. As a result, the CPU 21 performs the cancelled compression or expansion process canceled on the compression/expansion circuit 73 from the beginning using the compression/expansion task TS.

In S178 the CPU 21 transfers a start command for a compression or expansion process performed on the new data and the storage address for this data to the compression/expansion circuit 73. As a result, the compression/expansion circuit 73 is given priority for processing data having a larger size.

With the multifunction device 1 according to the fourth embodiment, the compression/expansion circuit 73 is controlled to execute a compression or expansion process in the compressed data acquisition process or expanded data acquisition process of functions having data with a larger data size. Accordingly, the multifunction device 1 according to the fourth embodiment processes data having a larger size and, therefore, requiring a longer processing time at a higher speed, thereby improving the overall processing speed of the multifunction device 1.

While the invention has been described in detail with reference to specific embodiments thereof, it would be apparent to those skilled in the art that many modifications and variations may be made therein without departing from the spirit of the invention, the scope of which is defined by the attached claims.

For example, in the above embodiments, the multifunction device 1 is provided with the LCD 41 as a display panel. However, the display panel may be electronic paper or an electroluminescence (EL) display.

Further, while different priorities are associated with each function in the third embodiment, different priorities may be associated with the compressed data acquisition process or the expanded data acquisition process in each function. Further, a plurality of functions may be associated with the same priority. In the latter case, priority for using the compression/expansion circuit 73 is given to functions whose data is currently being processed on the compression/expansion circuit 73 when the functions have the same priority. It is also possible to prevent use of the compression/expansion circuit 73 on functions assigned a prescribed priority (the lowest priority, for example) so that data for these functions is always compressed or expanded with the CPU 21.

Further, in the second control function (S200) and the first control function of the fourth embodiment (S180) described above, usage of the compression/expansion circuit 73 and CPU 21 is determined based on data size. However, the CPU 21 may determine which of the compression/expansion circuit 73 and CPU 21 to use based on the height, width, or surface area of an image corresponding to the data to be processed instead of the data size. Since the data can be assumed to have a large size when the height, width, or surface area of the corresponding image is large, this data can be processed efficiently by giving priority to using the compression/expansion circuit 73.

The facsimile procedure in which the multifunction device 1 transmits and receives data may conform to G3 (Group 3) capable of being used on an analog line or G4 (Group 4) capable of being used on an Integrated Services Digital Network (ISDN) line, or may be data transmission and reception using the Internet.

Further, in the digital camera output task (see FIG. 10), the multifunction device 1 targets data read from a digital camera connected to the multifunction device 1 or a memory card inserted in the multifunction device 1. However, in this process, the multifunction device 1 may target data read from a personal computer or hard disk drive connected to the multifunction device 1, for example.

As described above, when receiving data input for a compression or expansion process while already performing a compression or expansion process, the multifunction device 1 can begin the next compression or expansion task on the inputted data without waiting to complete the current process, thereby reducing the processing time required for the compression or expansion process and improving the overall processing speed. Further, since the processing speed can be improved without providing a plurality of compression/expansion circuits, the multifunction device 1 can suppress an increase in size and cost.

The CPU 21 executes compression and expansion tasks according to the programs to compress in the compression format or expand from the compression format data targeted for compression or expansion. The CPU 21 can perform multitasking control to execute a second compression and expansion task in parallel with a first compression and expansion task. In other words, by executing a plurality of compression and expansion tasks in parallel, a plurality of data segments targeted for a compression or expansion process can be processed in parallel.

What is claimed is:

1. A multifunction device having a plurality of functions, comprising:
    an input unit that receives image data;
    a general-purpose process unit that implements a plurality of tasks for each of the plurality of functions, the plurality of tasks including compression of the image data in a compression format and expansion of the image data which has been compressed,
    a single specific process unit controlled by the general-purpose process unit, the specific process unit implementing only two tasks, one task being compression of the image data in the compression format for each of the plurality of functions, the other task being expansion of the image data which has been compressed for each of the plurality of functions; and an output unit that outputs the image data, wherein the general-purpose process unit determines which the general-purpose process unit or the specific processing unit should implement the compression/expansion, wherein the input unit comprises at least one of a reception unit that receives the image data, a scan unit that scans the image data, and a reading unit that reads the image data from a recording media, and the output unit comprises at least one of a print unit that prints the image data, and a transmission unit that transmits the image data, and wherein the plurality of functions comprises a scan function for scanning the image data, a copy function for copying the image data, a facsimile function for transmitting/receiving the image data, and a print function for printing the image data.

2. The multifunction device according to claim 1, wherein the general-purpose process unit determines whether the specific process unit is implementing the task, and the general-purpose process unit simultaneously implements another task while the specific process unit is implementing the task.

3. A multifunction device having a plurality of functions, comprising:

an input unit that receives image data;

a general-purpose process unit that implements a plurality of tasks for each of the plurality of functions, the plurality of tasks including compression of the image data in a compression format and expansion of the image data which has been compressed, a single specific process unit controlled by the general-purpose process unit, the specific process unit implementing only two tasks, one task being compression of the image data in the compression format for each of the plurality of functions, the other task being expansion of the image data which has been compressed for each of the plurality of functions;

an output unit that outputs the image data, wherein the general-purpose process unit determines which the general-purpose process unit or the specific processing unit should implement the compression/expansion, and a storage that stores a resource table defining availability of the specific process unit for each of the plurality of functions, wherein the general-purpose process unit determines based on the resource table whether the task related to one of the plurality of functions is assigned to the specific process unit.

4. A multifunction device having a plurality of functions, comprising:

an input unit that receives image data;

a general-purpose process unit that implements a plurality of tasks for each of the plurality of functions, the plurality of tasks including compression of the image data in a compression format and expansion of the image data which has been compressed, a single specific process unit controlled by the general-purpose process unit, the specific process unit implementing only two tasks, one task being compression of the image data in the compression format for each of the plurality of functions, the other task being expansion of the image data which has been compressed for each of the plurality of functions;

an output unit that outputs the image data, wherein the general-purpose process unit determines which the general-purpose process unit or the specific processing unit should implement the compression/expansion, and a storage that stores a priority for each of the plurality of functions, wherein the general-purpose process unit instructs the specific process unit to implement the task of one of the functions having a higher priority prior to the task of another of the functions having a lower priority.

5. The multifunction device according to claim 4, wherein when the specific process unit is implementing a current task of a first function and the general-purpose process unit receives a new task of a second function, the general-purpose process unit determines which function has a higher priority between the first function and the second function, the general-purpose process unit instructs the specific process unit to suspend the current task when the second function is determined to have the higher priority than the first function, the general-purpose process unit then instructs the specific process unit to implement the new task, and the general-purpose process unit starts implementing the suspended current task.

6. The multifunction device according to claim 4, wherein the general-purpose process unit instructs the specific process unit to implement the task of the function has a higher priority.

7. The multifunction device according to claim 1, wherein the general-purpose process unit determines which task has a largest amount of data to be processed, the general-purpose process unit instructs the specific process unit to process the task having the largest amount of data on a priority basis.

8. The multifunction device according to claim 1, wherein the general-purpose process unit determines whether the specific process unit is available for a new task when the input unit starts receiving the image data for the new task.

9. A multifunction device having a plurality of functions, comprising:

an input unit that receives image data;

a general-purpose process unit that implements a plurality of tasks for each of the plurality of functions, the plurality of tasks including compression of the image data in a compression format and expansion of the image data which has been compressed, a single specific process unit controlled by the general-purpose process unit, the specific process unit implementing only two tasks, one task being compression of the image data in the compression format for each of the plurality of functions, the other task being expansion of the image data which has been compressed for each of the plurality of functions; and an output unit that outputs the image data, wherein the general-purpose process unit determines which the general-purpose process unit or the specific processing unit should implement the compression/expansion, wherein when the general-purpose process unit determines that two tasks related to the compression/expansion are required to implement simultaneously, the general-purpose process unit determines which task is appropriate for the specific process unit should implement, and the general-purpose process unit implements one of the two tasks when determining that an other of the two tasks is appropriate for the specific process unit.

* * * * *